US007130912B2

(12) United States Patent
Nishikado et al.

(10) Patent No.: US 7,130,912 B2
(45) Date of Patent: Oct. 31, 2006

(54) DATA COMMUNICATION SYSTEM USING PRIORITY QUEUES WITH WAIT COUNT INFORMATION FOR DETERMINING WHETHER TO PROVIDE SERVICES TO CLIENT REQUESTS

(75) Inventors: Takashi Nishikado, Ebina (JP);
Yoshihiro Tanaka, Hiratsuka (JP);
Kansuke Kuroyanagi, Yokohama (JP);
Hideo Aoki, Yokohama (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 10/231,265

(22) Filed: Aug. 30, 2002

(65) Prior Publication Data
US 2003/0188013 A1 Oct. 2, 2003

(30) Foreign Application Priority Data
Mar. 26, 2002 (JP) .............................. 2002-084748

(51) Int. Cl.
*G06F 15/16* (2006.01)
(52) U.S. Cl. ...................... 709/229; 709/227; 709/225
(58) Field of Classification Search ........ 709/223–229, 709/217, 222, 238–244; 718/102, 105; 701/208; 370/389; 710/310
See application file for complete search history.

(56) References Cited

U.S. PATENT DOCUMENTS

| 6,003,082 | A | 12/1999 | Gampper et al. | |
| 6,308,238 | B1* | 10/2001 | Smith et al. | 710/310 |
| 6,381,639 | B1* | 4/2002 | Thebaut et al. | 709/222 |
| 6,427,161 | B1* | 7/2002 | LiVecchi | 718/102 |
| 6,535,509 | B1* | 3/2003 | Amicangioli | 370/389 |
| 6,604,046 | B1* | 8/2003 | Van Watermulen et al. | 701/208 |
| 2002/0055980 | A1 | 5/2002 | Goddard | |
| 2002/0055982 | A1* | 5/2002 | Goddard | 709/217 |
| 2002/0194342 | A1* | 12/2002 | Lu et al. | 709/227 |
| 2004/0122953 | A1* | 6/2004 | Kalmuk et al. | 709/227 |

FOREIGN PATENT DOCUMENTS

| JP | 4150542 | 5/1992 |
| JP | 10229405 | 8/1998 |
| JP | 2000228672 | 8/2000 |
| JP | 200169175 | 3/2001 |
| JP | 2002140309 | 5/2002 |
| WO | 0190903 | 11/2001 |

OTHER PUBLICATIONS

R. Fielding, et al "RFC268 Hypertext Transfer Protocol, HTTP/1.1", Jan. 1997, pp. 1-162.

* cited by examiner

*Primary Examiner*—Le Hien Luu
(74) *Attorney, Agent, or Firm*—Mattingly, Stanger, Malur & Brundidge, P.C.

(57) ABSTRACT

A service system in which a server offers a service in response to a request from a client. The system can offer the stable service even in the case of an access from the client and also can offer a preferential service under certain conditions. The request from the client to the server is carried out via a data communication forwarding apparatus, the apparatus has a unit for queuing the request with a priority and has a unit for changing the forwarding sequence of the request according to the priority. Thereby the number of simultaneous requests to the server can be suppressed to within the processing ability of the server with the stable service. Further, the request can be preferentially processed according to the user, transaction, wait time, etc.

15 Claims, 23 Drawing Sheets

FIG.4

16 CONNECTION MANAGEMENT TABLE

| DESTINATION | NEXT HOP | MAXIMUM CONNECTION NUMBER | CONNECTION NUMBER | MAXIMUM QUEUING NUMBER | MAXIMUM WAITING TIME | MAXIMUM WAITING COUNT | REQUEST QUEUE | CONDITION FOR UPDATE OF PRIORITY TOKEN |
|---|---|---|---|---|---|---|---|---|
| dst1 | DIRECT | 15 | 15 | 50 | 60 | 5 | ... | ... |
| dst2 | proxyX | 100 | 80 | 500 | 90 | 5 | ... | ... |
| ... | ... | ... | ... | ... | ... | ... | ... | ... |
| dstN | DIRECT | 20 | 5 | 60 | 60 | 4 | ... | ... |
| 21 | 22 | 23 | 24 | 25 | 26 | 27 | 28 | 29 |

FIG.10

16 CONNECTION MANAGEMENT TABLE

| DESTINATION | NEXT HOP | ... | ... | ... | ... | ... | ... | ... | APPLICABLE PRIVILEGE INFORMATION | INTERNAL PRECEDENCE INFORMATION |
|---|---|---|---|---|---|---|---|---|---|---|
| serverX | DIRECT | ... | ... | ... | ... | ... | ... | ... | 1~n | 5 |
| *.aaa.bbb | proxyX | ... | ... | ... | ... | ... | ... | ... | 5~n | 10 |
| ... | ... | ... | ... | ... | ... | ... | ... | ... | ... | ... |
| ARBITRARY | DIRECT | ... | ... | ... | ... | ... | ... | ... | 1~3 | 1 |
| 21 | 22 | 23 | 24 | 25 | 26 | 27 | 28 | 29 | 201 | 202 |

FIG.12

110 ADDRESS/PROCESS PRIVILEGE CONVERSION TABLE

| CLIENT ADDRESS | SERVER ADDRESS | PROCESS PRIVILEGE |
|---|---|---|
| 192.168.10.0/24 | *(ARBITRARY) | 2 |
| ⋮ | ⋮ | ⋮ |
| *(ARBITRARY) | *.aaa.bbb.ccc | 7 |

50 REQUEST

| DESTINATION INFORMATION | AUTHENTICATION INFORMATION | |
|---|---|---|

51　　　　52

120 USER/PROCESS PRIVILEGE CONVERSION TABLE

| USER'S AUTHENTICATION INFORMATION | PROCESS PRIVILEGE |
|---|---|
| userA:password-A | 2 |
| ⋮ | ⋮ |
| userX:password-X | 7 |

53 PRIORITY TOKEN INFORMATION

| PROCESS PRIVILEGE INFORMATION | DESTINATION ADDRESS INFORMATION | VALID PERIOD INFORMATION | INITIAL STARTING TIME INFORMATION | PRIORITY TOKEN UPDATING COUNT INFORMATION | CONNECTION ESTABLISHMENT COUNT INFORMATION | TOTAL CONNECTION WAITING TIME INFORMATION |
|---|---|---|---|---|---|---|
| 531 | 532 | 533 | 534 | 535 | 536 | 537 |

FIG.20

16 CONNECTION MANAGEMENT TABLE

| DESTINATION | NEXT HOP | | | | | | | PRIORITY TOKEN UPDATING CONDITIONS | |
|---|---|---|---|---|---|---|---|---|---|
| serverX | DIRECT | ... | ... | ... | ... | ... | ... | ... | ... |
| *.aaa.bbb | proxyX | ... | ... | ... | ... | ... | ... | ... | ... |
| ... | ... | ... | ... | ... | ... | ... | ... | ... | ... |
| ARBITRARY | DIRECT | ... | ... | ... | ... | ... | ... | ... | ... |
| 21 | 22 | 23 | 24 | 25 | 26 | 27 | 28 | 29 | 201 202 |

20

| UPDATABLE PERIOD | MAXIMUM UPDATE COUNT | MAXIMUM CONNECTION ESTABLISHMENT COUNT | PRESCRIBED CONNECTION ESTABLISHMENT COUNT | PRESCRIBED CONNECTION WAITING TIME |
|---|---|---|---|---|
| 291 | 292 | 293 | 294 | 295 |

29

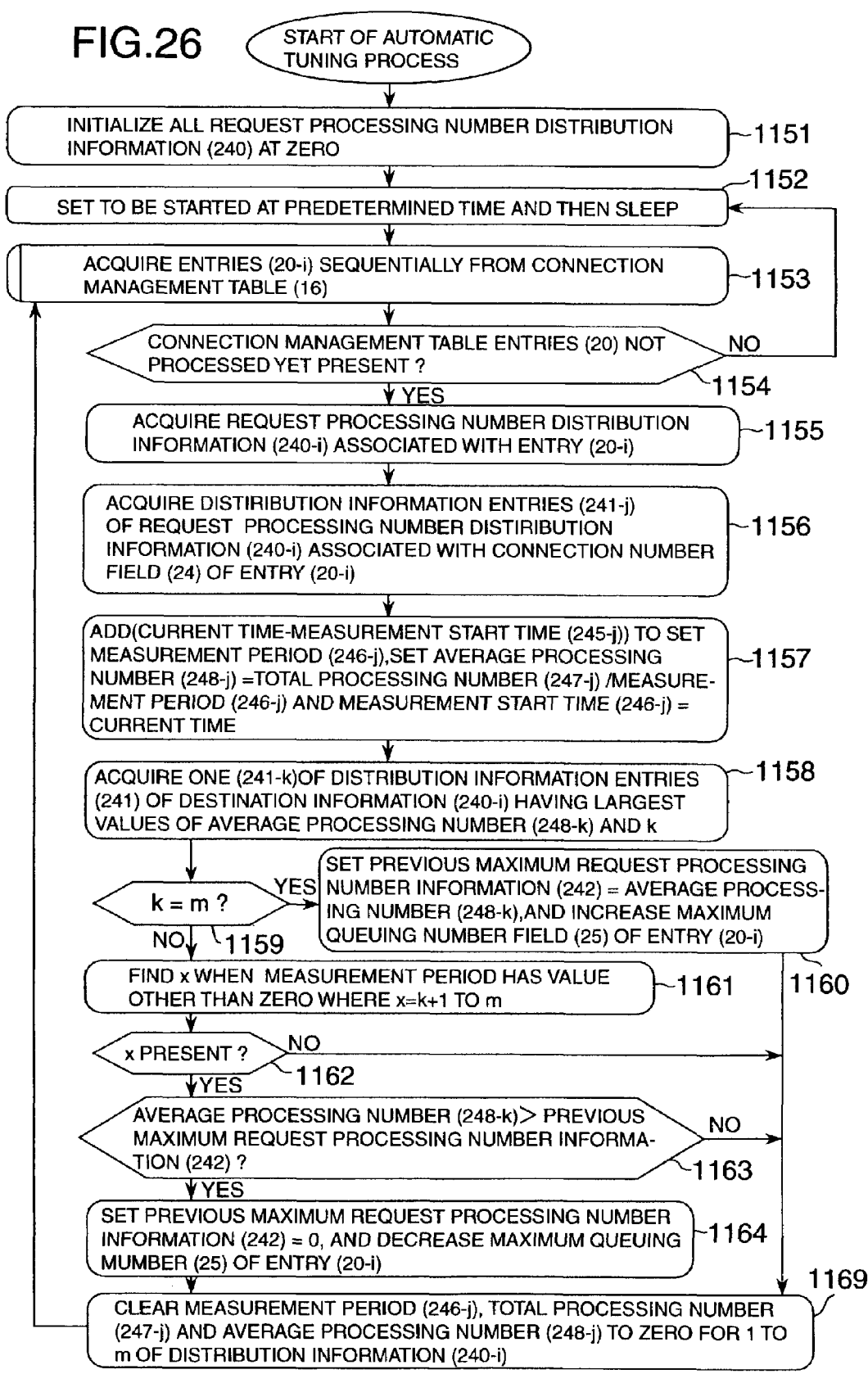

DATA COMMUNICATION SYSTEM USING PRIORITY QUEUES WITH WAIT COUNT INFORMATION FOR DETERMINING WHETHER TO PROVIDE SERVICES TO CLIENT REQUESTS

BACKGROUND OF THE INVENTION

The present invention relates to a method for realizing data communication between a client apparatus and a server apparatus with use of a data communication forwarding apparatus.

As the Internet infrastructure spread rapidly, services such as ticket reservation and bank/securities transaction, which have been so far received at the counter of sales offices, have also been offered in the form of an access to the Web server via the Internet.

Details of HTTP (Hypertext Transfer Protocol) as a communication protocol used for the access to the Web server and how to use the protocol are explained in detail in RFC2068 (Hypertext Transfer Protocol—HTTP/1.1)) issued in January, 1997.

Such services as ticket reservations and bank/securities transactions, however, tend to receive heavily concentrated service requests depending on time band. Furthermore, these services require database access, so it is difficult to distribute processings and this inevitably causes a specific Web server playing a role of the services to inevitably receive access concentration disadvantageously.

As the access is concentrated and a load is rapidly increased in the Web server, the processing performance of the Web server will generally extremely drop when compared to that at its low load state. As a result, service requests are further accumulated, which leads to a service failure in the worst case.

Under such a concentrated access condition, all the service requests cannot be processed satisfactorily, in a word, an important user's service request will also be compelled to wait for without distinction from general users. In addition, even when a service request is issued later, the service may happen to be accepted by chance. Or in spite of a long wait, the service cannot be realized. In this case, in particular, the user repeats the access operation many times, which causes a further increased access concentration and load.

SUMMARY OF THE INVENTION

In accordance with the present invention, there is provided a technique for suppressing reduction in performance caused by a load concentration to a specific server. Further, the preferential processing of a service request can be realized according to the attribute of a user. Furthermore, the present invention provides a technique which can reduce its infinite and long wait time of even a service request not subjected to the preferential processing and can decrease a repeating operations by the users.

The present invention provides a technique which controls arrival of a service request at a server and controls a load of the server to offer quick response services.

In accordance with an aspect of the present invention, a data communication forwarding apparatus for forwarding a data communication exists between a client apparatus and a server apparatus. The data communication forwarding apparatus has a connection forwarding processing unit for forwarding a connection request between the client apparatus and server apparatus, a data forwarding processing unit for forwarding a data communication, and a request queuing processing unit for temporarily holding a request.

The request queuing processing unit queues service requests from the client apparatus as necessary. More specifically, when the request queuing processing unit judges service requests from client apparatuses to a specific server apparatus or to a specific group of server apparatuses are concentrated, the request queuing processing unit will not forward the service request immediately thereto and once queue the service request to control of forward of the service request to the server apparatus or apparatuses.

In accordance with a specific aspect of the present invention, the data communication forwarding apparatus has a connection forwarding processing unit for forwarding a connection request between a client apparatus and a server apparatus, a data forwarding processing unit for forwarding a data communication, a connection management processing unit, and a request queuing processing unit. The connection management processing unit monitors a connection state and manages the number of connections currently established to a specific server apparatus or to a specific group of server apparatuses. The "connection" means a logical communication path established between the client apparatus and the server apparatus, and after the connection is established, various services are offered through the path.

The request queuing processing unit queues a connection establishment request associated with a service request from the client apparatus as necessary. For the connection establishment request from the client apparatus to a specific server apparatus or to a specific group of server apparatuses, if a maximum connection number or more connections are already established to the same server apparatus or to the group of server apparatuses is, then the request queuing processing unit will not forward the connection establishment request immediately, once queue the request, and control the forward of the connection establishment request in such a manner the number of connections to the same destination or destinations becomes smaller than the maximum connection number.

When a server apparatus usually starts its service receiving a service request from a client apparatus, it, first of all, becomes necessary to establish the aforementioned connection. In accordance with the above aspect of the present invention, the data communication forwarding apparatus limits the establishment of the connection to control the forward of the service request. The control of the number of the service request enables control of the load of the server which is caused by service requests.

The request queuing processing unit, which has a plurality of queues (also called priority queues) based on priorities, also queues the request on a corresponding priority queue according to the priorities allocated to the requests. When extracting the request from the queue, the request queuing processing unit extracts the request from the priority queue having a higher priority and performs request forward control according to the priority.

The request queuing processing unit may further have an anti-starvation processing unit. The anti-starvation processing unit, for example, holds information on the wait frequency of a request left due to high-priority requests. When the wait frequency of a request exceeds a maximum number, the anti-starvation processing unit extracts the request from the queue first even if there is another request with a higher-priority therein, so long as the higher-priority request is lower than a certain priority.

The anti-starvation processing unit may hold information on request arrival times of requests in place of the wait frequency information, compare a wait time after each request arrival time with a certain maximum wait time, and prevent the starving of the request due to the higher-priority requests. Further, it may be realized on the basis of a combination of the maximum wait frequency and the maximum wait time.

The request queuing processing unit may hold information on the number of establishable connections and perform forward control over a request on the basis of the connection number information. More specifically, the request queuing processing unit may hold information about the maximum number of connections currently established for each priority queue and about the establishable maximum connection number and perform forward control over the request on the basis of the information. That is, when extracting requests from a queue, the request queuing processing unit extracts requests sequentially from a priority queue having the maximum connection number allocated thereto or less and having a higher priority.

Alternatively not only the request queuing processing unit but also the data forwarding processing unit of the data communication forwarding apparatus may set priority information at data to be forwarded according to priorities allocated to requests, or the connection forwarding processing unit may select suitable one of a plurality of communication paths directed to the destination for data forwarding based on the priority.

Through the aforementioned processing units, some of servers, they have a lot of access requests, can protect their performance go down, using request's numbers keep constant value or less, and privilege processing can be realized according to user's attributes or the like.

In this case, priority setting (also called mapping) of each request is allocated, for example, by processing units which follow.

For example, a priority setting processing unit is such a processing unit that prepares a table for mapping a priority to the address of a client apparatus or to a pair of the address of the client apparatus and the address of a server apparatus as a destination, and finds the priority of each request with use of the table.

Further, the priority setting processing unit may be such a processing unit that prepares a table for mapping a priority to each request from user's authentication information of the client apparatus offered together with the request of the client apparatus, and finds the priority of each request using the table.

Further, the priority setting processing unit may be such a processing unit that maps a priority to each request on the basis of priority token information offered together with the request of a client apparatus.

The priority token information may contain, for example, information about the address of a server apparatus or the addresses of a group of server apparatuses as a destination or destinations, and priority information. Further, as necessary, the priority token information may contain information about the valid period of the priority token information. The aforementioned mapping processing unit to the priority using the priority token information examines set conditions of whether or not the address of the destination server apparatus of the request conforms to the address information about the server apparatus or apparatuses included in the priority token information and/or whether or not it is within the valid period based on the valid period information. If the conditions are satisfied, then the mapping processing unit determines the priority of the request according to the priority information of the priority token information.

The data communication forwarding apparatus or server apparatus has a priority token information return processing unit, and the associated client apparatus acquires the above priority token information as a response to the request to the server apparatus. The client apparatus has a processing unit which issues a request using the priority token information returned from the data communication forwarding apparatus or the server apparatus, and the processing unit can perform priority control over the request using the priority token information.

In accordance with another aspect of the present invention, when the priority control is employed using the priority token information, even a user not subjected to the preferential processing can reduce an indefinite and long wait time and reduce user's re-execution frequency. To this end, the above data communication forwarding apparatus has a priority token generation/update processing unit and a priority token return processing unit.

The priority token generation/update processing unit generates priority token information under certain conditions when failing to receive the priority token information from the client apparatus; whereas, the priority token generation/update processing unit updates or discards the priority token under certain conditions when receiving the priority token information from the client apparatus.

The priority token return processing unit attaches the priority token information not generated or updated by the priority token generation/update processing unit to a response to the client apparatus and returns it thereto.

The priority token generation/update processing unit is arranged, for example, so as to refer to maximum queuing frequency information held as associated with a specific destination server apparatus or a specific group of server apparatuses, and to generate priority token information enabling mapping to a priority higher than normal time when receiving requests exceeding the maximum queuing frequency from the client apparatuses. Meanwhile, the priority token return processing unit is arranged so as to return the generated priority token information to the client apparatuses together with congestion error information.

The priority token generation/update processing unit further may refer to maximum queuing time information held as associated with a specific destination server apparatus or a specific group of server apparatuses and, when a queuing time exceeds the maximum queuing time, the priority token generation/update processing unit may generate priority token information enabling mapping to a priority higher than its normal time. Meanwhile, the priority token return processing unit may return the generated priority token information to the client apparatus together with timeout error information.

The priority token generation/update processing unit may set an valid period for the above priority token information in such a manner that, when generating the priority token information enabling mapping to a priority higher than its normal situation, the information becomes effective after a predetermined period on.

There is also another method of performing a higher level of priority control using processing units which follow.

The above priority token information may contain, in addition to the information about the destination server apparatus or apparatuses, valid period and priority, any one or more of initial start time information of an valid period at the time of initial generation, priority token update frequency information, connection establishment frequency information to server apparatus and total connection wait time information.

The priority token generation/update processing unit may be arranged so that, when the above information fails to exceed a predetermined updatable period from the initial start time, a predetermined maximum update frequency or a maximum connection establishment frequency, the priority token generation/update processing unit updates the priority token information and, when the conditions are not satisfied, the priority token generation/update processing unit generates new priority token information or does not update the priority token information and discards it. The priority token generation/update processing unit also may be arranged so that, when the above information exceeds a predetermined connection establishment frequency, a predetermined connection wait time, or the above maximum queuing frequency, the priority token generation/update processing unit generates priority information enabling mapping to a higher priority.

The above priority token generation/update processing unit also may be arranged, when the priority token information can be updated or generated, updates or initializes the valid period information, update frequency information, connection establishment frequency information and connection wait time information, and generates priority token information on the basis of these information and the generated priority token information, and so that the priority token return processing unit returns the generated priority token information to the client apparatus together with a reply to the request.

Further, the server apparatus may have a priority token control processing unit which instructs the priority token generation/update processing unit to perform its generation and updating operation. That is, the priority token control processing unit of the server apparatus, when returning a reply to the client apparatus, attaches the priority token control information indicative of whether or not to generate/update the priority token information and/or to change the priority to the reply and then returns it. The priority token generation/update processing unit of the data communication forwarding apparatus, when receiving the priority token control information, refers to the instruction of the control information and generates priority token information or updates the priority token information.

In a system having an unreliable client apparatus, in this connection, the priority token return processing unit may be arranged so as to encrypt the priority token information to avoid the client apparatus from tampering with it and to return it to the client apparatus.

Such various parameters as mentioned above including the maximum connection number, maximum wait frequency, maximum wait time, maximum connection number for each priority queue, valid period information, maximum queuing frequency, maximum queuing time, updatable period, maximum update frequency, maximum connection establishment frequency, prescribed connection establishment frequency, and prescribed connection wait time may be set based on the parameter setting function of the connection management processing unit by an operator or operators of a specific destination server apparatus or a specific group of server apparatuses.

Further, the data communication forwarding apparatus may further a processing throughput measuring processing unit and a maximum connection number automatic tuning processing unit, and can automatically set a maximum connection number for a specific server apparatus or for each of a specific group of server apparatuses.

In this case, the processing throughput measuring processing unit measures a request processing number per unit time of a specific server apparatus or each of the server apparatuses, and the maximum connection number automatic tuning processing unit automatically tunes the maximum connection number on the basis of the measured value. When the connection number to the specific server apparatus or apparatuses reaches a current maximum connection number but when the number of requests to be processed per unit time of the server apparatus or apparatuses is not decreased, the maximum connection number automatic tuning processing unit increases the maximum connection number of the server apparatus or apparatuses in a certain range and, when the number of requests to be processed tends to decrease in the vicinity of the set maximum connection number, decreases the value of the maximum connection number.

With such an arrangement, when the priority is temporarily increased or the processing is once started according to the wait time or utilization frequency, the priority can be made high for a period of constant time. As a result, the user can receive the service relatively quickly after some extent of waiting time, and thus an indefinite long service waiting time can be avoided and user's re-execution operation resulting from the indefinite long service waiting time can be suppressed.

Other objects, features and advantages of the invention will become apparent from the following description of the embodiments of the invention taken in conjunction with the accompanying drawings.

BRIEF DESCRIPTION OF THE DRAWINGS

FIG. 4 shows a structure of a connection management table in the present embodiment;

FIG. 10 is another structure of the connection management table in the present embodiment;

FIG. 12 is a structure of an address/process privilege conversion table used in the present embodiment to find a process privilege from the address of the client apparatus and the address of the destination server apparatus;

FIG. 13 is a structure of a request from the client apparatus to find a process privilege from the authentication information of a user in the present embodiment;

FIG. 19 is another structure of the priority token information in the present embodiment;

FIG. 20 is a structure of the connection management table associated with the priority token information of FIG. 19 in the present embodiment;

FIG. 26 is a flowchart showing operations of a maximum connection number automatic tuning processing unit of automatically tuning a maximum connection number field for each connection management table entry in the present embodiment.

DESCRIPTION OF THE EMBODIMENTS

Embodiments of the present invention will be explained with reference to the accompanying drawings.

Figure 1:
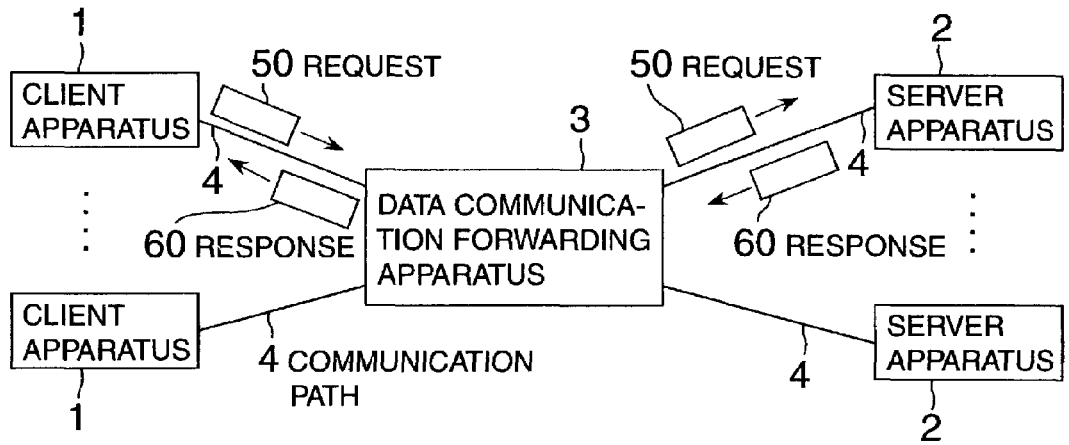
FIG. 1 is a configuration of a system using a data communication forwarding apparatus in accordance with an embodiment of the present invention.

FIG. 1 shows a configuration of a system using a data communication forwarding apparatus of an embodiment of the present invention.

In the present embodiment, client apparatuses 1 and server apparatuses 2 are connected with each other via communication paths 4 and via one or more data communication forwarding apparatuses 3. The data communication forwarding apparatus 3 forwards a data communication between the client apparatus 1 and server apparatus 2. That is, a service request 50 issued from the client apparatus 1 to the server apparatus 2 is sent necessarily via one or more data communication forwarding apparatuses 3; whereas, a response 60 issued from the server apparatus 2 to the client apparatus 1 is always sent via the data communication forwarding apparatus or apparatuses 3. In this connection, the word "communication path 4" as used herein is not always required to correspond to a physical communication path or line but may be a logical communication path implemented on the physical communication path.

Figure 2:
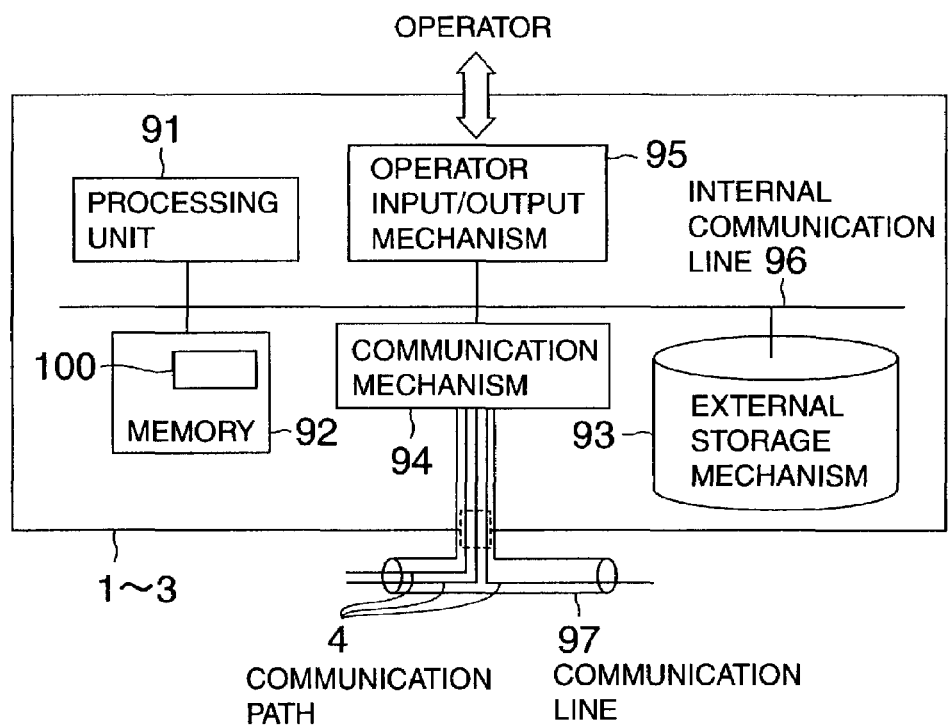
FIG. 2 is a physical structure of each of client apparatuses, server apparatuses, and data communication forwarding apparatus in the present embodiment.

FIG. 2 shows an example of a physical arrangement of each of the client apparatuses 1, server apparatuses 2 and data communication forwarding apparatuses 3 in the present embodiment. Each of these apparatuses may be physically a general information processing device as shown in FIG. 2. More specifically, each information processing device, for example, includes a processing unit 91, a memory 92, an external storage mechanism 93, a communication mechanism 94, and an operator input/output mechanism 95, which are connected by an internal communication line 96. The processing unit 91 executes an information processing program 100 stored in the memory 92. The memory 92 also stores, in addition to the information processing program 100, various types of data to be referred to by the information processing program 100.

The external storage mechanism 93 holds the information processing program 100 and various sorts of data in a non-volatile form. The information processing program 100 to be run on the processing unit 91 instructs the external storage mechanism 93 to load a necessary programs or data into the memory 92 or conversely to store the program or data on the memory 92 into the external storage mechanism 93. Or the program may be previously stored in the external storage mechanism 93. Or the program may be introduced as necessary from an external device via a portable storage medium or a communication medium.

The communication mechanism 94 is connected to a communication line 97 under control of an instruction from the information processing program 100 to transmit data to another information processing device or communication device or conversely to receive data from the other information processing device or communication device and store it in the memory 92. The logical communication path 4 wired between the apparatuses is implemented by the communication mechanism 94 and physical communication line 97.

The operator input/output mechanism 95 literally performs data input/output operation by an operator. The, internal communication line 96, which comprises, for example a bus, is provided to establish mutual communication between the processing unit 91, memory 92, external storage mechanism 93, communication mechanism 94 and operator input/output mechanism 95.

It is not necessarily required for the client apparatus 1, server apparatus 2 and data communication forwarding apparatus 3 to have physically different structures. Differences in function between these apparatuses 1 and 2 and apparatus 3 may be implemented by the information processing program 100 to be run on each device or apparatus.

In the following explanation of an embodiment, constituent elements in the present embodiment will be explained in terms of 'processing units'. However, each processing unit is shown as having a logical structure so that it may be implemented in the form of a physical mechanism or in the form of a function realized by the information processing program 100. Further, it is also necessarily required for the client apparatus 1, server apparatus 2 and data communication forwarding apparatus 3 to be respectively independent, physical apparatuses and apparatus. One of these apparatuses may be designed to realize the functions of these apparatuses 1, 2 and apparatus 3 at the same time.

Figure 3:
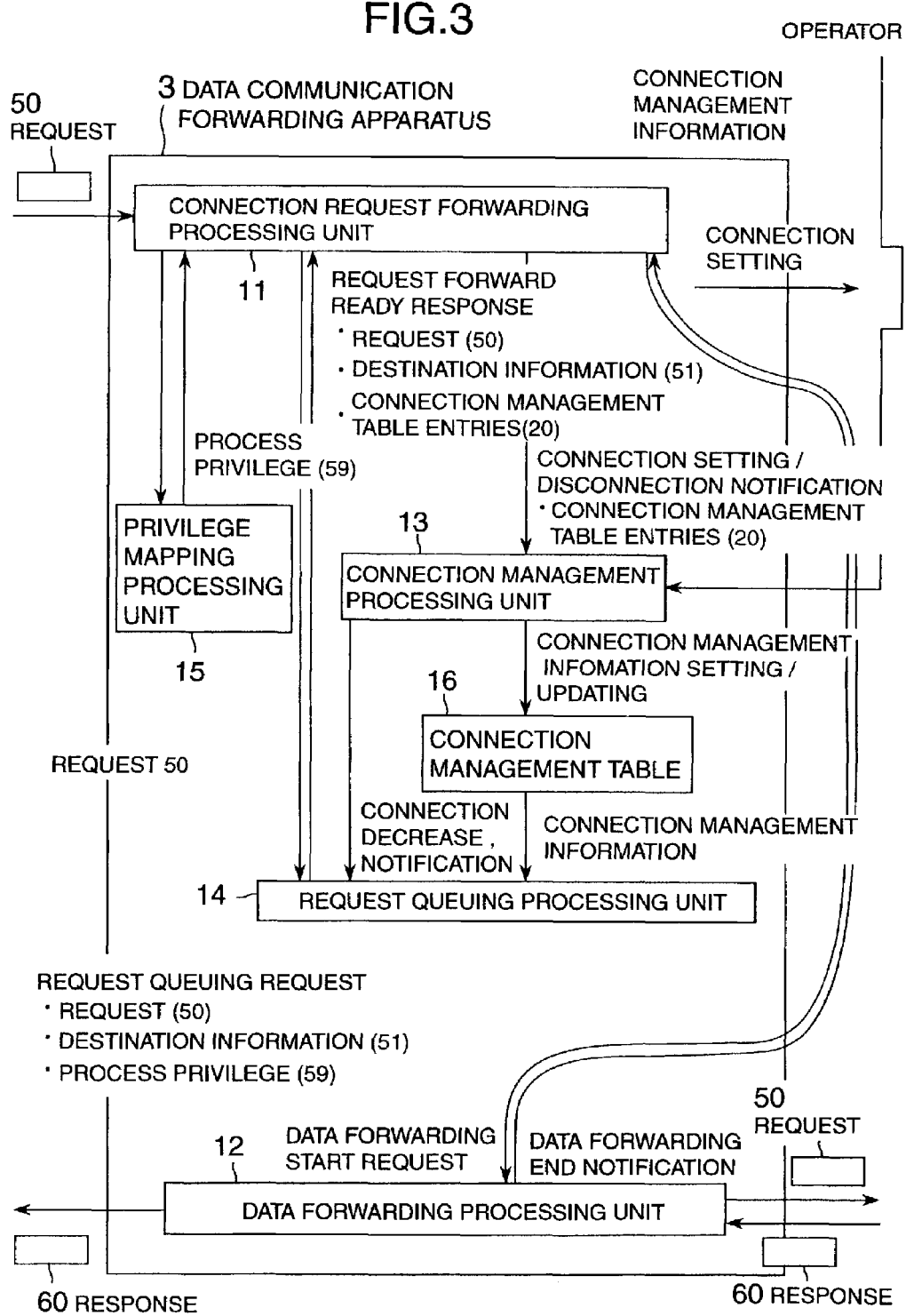
FIG. 3 is an arrangement of the data communication forwarding apparatus of the present embodiment.

FIG. 3 is a structure of the data communication forwarding apparatus 3 in the present embodiment.

The data communication forwarding apparatus 3 of the present embodiment includes a connection forwarding processing unit 11 for forwarding a connection request, a data forwarding processing unit 12 for forwarding a data communication, a connection management processing unit 13, a request queuing processing unit 14, a privilege mapping processing unit 15, and a connection management table 16.

FIG. 4 shows an example of a structure of the connection management table 16 in the present embodiment. The connection management table 16, which is a table using a destination field 21 as a key, is used to manage a connection or connections to a specific destination server apparatus or apparatuses shown by the destination field 21 or to queue a request. Each of entries 20 in the connection management table 16 in the present embodiment contains, in addition to the destination field 21, a next hop (forwarding destination) 22, a maximum connection number field 23, a connection number field 24, a maximum queuing number field 25, a maximum wait time field 26, a maximum wait frequency field 27, and a request queue 28. The entry also contains priority token updating condition information 29 indicative of updating conditions of priority token information (to be described later) as an option.

The destination field 21 is a field for specification of a destination to be subjected to connection management, and holds information about a symbolic host name or names, a domain name or names, an IP address or addresses, or an IP segment address or addresses of a destination server apparatus or apparatuses, and so on. The next hop field 22 indicates the destination of a request to be forwarded to a destination of the management object indicated by the destination field 21. The maximum connection number field 23 and connection number field 24 hold the maximum number of connections capable of being established at the same time for the destination of the management object and the number of connections being currently established, respectively. Requests to the destination of the management object exceeding the value shown in the maximum connection number field 23 are queued in the request queue 28. The maximum queuing number field 25, maximum wait time field 26 and maximum wait frequency field 27 are parameters relating to the queuing operation of the request to the request queue 28. The maximum queuing number field 25 holds the maximum number of requests capable of being queued for the destination of the management object, the maximum wait time field 26 holds a maximum value of an overtaking wait time overtaken by a priority request later arrived, and the maximum wait frequency field 27 holds the maximum value of the number of waits overtaken by requests later arrived.

The connection forwarding processing unit 11 forwards a connection request between the client apparatus 1 and server apparatus 2. The connection forwarding processing unit 11 first receives a service request 50 from the client apparatus 1 and establishes a connection with the client apparatus 1. And the connection forwarding processing unit 11 establishes the connection to the server apparatus 2 and forwards the connection request according to a destination information 51 included in the request 50. At this time, the connection forwarding processing unit 11 refers to the connection management table 16 and, when a corresponding entry 20 is present to the destination shown in the destination information 51, changes the next hop according to the information of the next hop field 22 of the entry 20, and forwards the connection request to the destination server apparatus 2, another server apparatus 2 or another data communication forwarding apparatus 3.

The data forwarding processing unit 12 forwards a data communication between the client apparatus 1 and server apparatus 2. The data forwarding processing unit 12, using the connection established by the connection forwarding processing unit 11, forwards the request 50 received from the client apparatus 1 to the server apparatus 2. And the data forwarding processing unit 12 forwards a response 60 received from the server apparatus 2 to the client apparatus 1. In this case, as necessary, the processing unit 12 sets priority information associated with a process privilege 59 of the request 50 obtained by the privilege mapping processing unit 15 in an IP packet of data to be forwarded, and forwards the data.

The connection management processing unit 13 monitors the state of the connection established by the connection forwarding processing unit 11, and manages the number of connections being currently established in the connection number field of the connection management table 16 for a specific server apparatus or apparatuses.

The connection management processing unit 13 also receives an instruction from the operator, registers and initializes the entry 20 in the connection management table 16. More specifically, the connection management processing unit 13 specifies information about the destination field 21, next hop field 22, maximum connection number field 23, maximum queuing number field 25, maximum wait time field 26, maximum wait frequency field 27 and priority token updating condition information 29, received a registration request of the connection management table entry 20 from the operator, generates a new connection management table entry 20, sets information for the specified respective fields, initializes the connection number field 24 at zero, and initializes the request queue 28 at its blank state.

The request queuing processing unit 14 queues the request to a specific server apparatus or apparatuses specified in the connection management table entry 20, and suppresses the number of simultaneous connections to the specific server apparatus or apparatuses to the value of the maximum connection number field 23 of the same entry 20 or less. More in detail, when an entry 20 corresponding to the destination of the request 50 is present in the connection management table 16, the request queuing processing unit 14 examines whether or not the value of the connection number field 24 of the same entry 20 reaches the value of the maximum connection number field 23. If the value of the connection number field 24 reaches the value of the maximum connection number field 23, then the request queuing processing unit 14 does not forward the request 50 immediately, and once queues it in the request queue 28. And after the processing of a request to the server apparatus or apparatuses is completed and the connection is disconnected therefrom, the request queuing processing unit 14 extracts the requests 50 sequentially from the request queue 28 and forwards them.

The privilege mapping processing unit 15, on the basis of the address of the client apparatus 1 as the request originator, the address of the destination server apparatus 2 and information offered together with the requests 50, determines processing priorities 59 for the respective requests 50.

Figure 5:
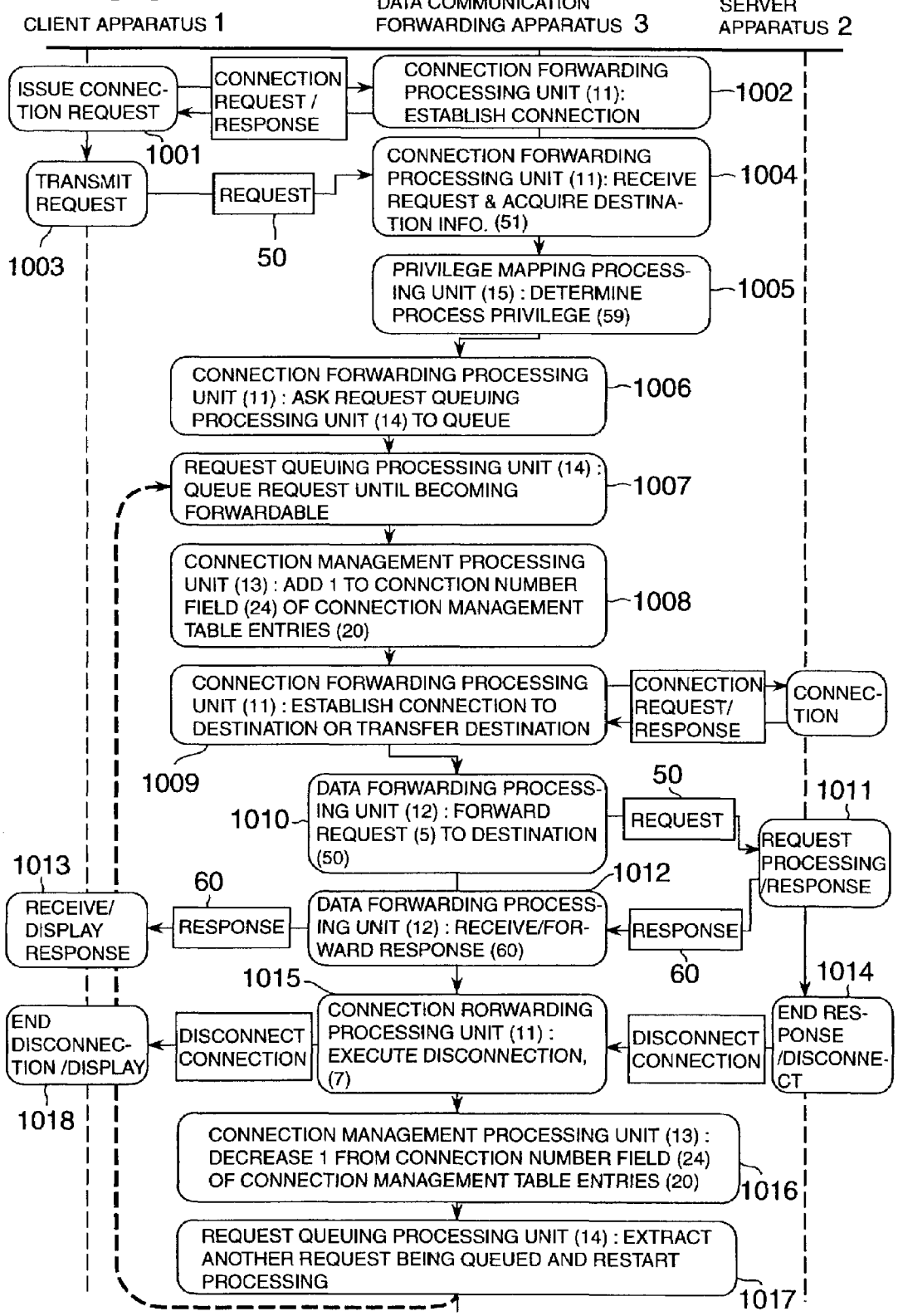
FIG. 5 is a flowchart showing a flow of forward operations in the data communication forwarding apparatus of the present embodiment.

FIG. 5 is a flowchart showing a flow of forwarding operations in the data communication forwarding apparatus 3 of the present embodiment.

The client apparatus 1 first issues a request for a connection establishment to the destination server apparatus 2 via the data communication forwarding apparatus 3 (process 1001).

In this connection, the client apparatus 1 may issue the request via the data communication forwarding apparatus 3 as directed to the data communication forwarding apparatus 3, or routers or the like for forwarding a data communication may transmit the request directed to the destination server apparatus 2 to the data communication forwarding apparatus 3 as the client apparatus 1 is transparent apparatus.

When receiving the connection establishment request from the client apparatus 1, the connection forwarding processing unit 11 of the data communication forwarding apparatus 3 establishes a connection to the client apparatus 1 (process 1002).

When the connection is established, the client apparatus 1 transmits the request 50 directed to the server apparatus 2 to the data communication forwarding apparatus 3 via the connection (process 1003).

The connection forwarding processing unit 11 of the data communication forwarding apparatus 3 receives the request 50 and extracts destination information 51 included in the request 50 (process 1004).

Next, the connection forwarding processing unit 11 passes the received request 50 to the privilege mapping processing unit 15, which in turn determines process privilege 59 of each request 50 on the basis of the address of the destination server apparatus 2 and information provided together with the request 50 (process 1005).

The connection forwarding processing unit 11 then passes the request 50, destination information 51 and the request process privilege 59 to the request queuing processing unit 14, and asks the request queuing processing unit 14 to queue the service request 50 until the forward of the request becomes possible (process 1006).

The received request queuing processing unit 14 refers to the connection management table 16, queues the request 50 in the request queue 28 of the corresponding connection management table entry 20 as necessary and, at the stage that the forward became possible, returns the forward-enabled request 50, destination information 51 and the connection management table entry 20 associated with the destination to the connection forwarding processing unit 11 (process 1007).

The connection forwarding processing unit 11 asks the connection management processing unit 13 to increase the value of the connection number field 24 of the same entry 20 by 1 when the corresponding connection management table entry 20 is present in the destination (process 1008).

Thereafter, if the corresponding connection management table entry 20 is present in the destination, then the connection forwarding processing unit 11 establishes a connection for the destination address shown in the next hop field 22 of the same connection management table entry 20; while, if not, then the connection forwarding processing unit 11 establishes a connection for a destination address shown in the destination information 51 (process 1009). In this connection, the destination server apparatus 2 or next hop device as its party also receives the connection establishment request from the data communication forwarding apparatus 3 and establishes a connection with the data communication forwarding apparatus 3.

Next, control goes to the data forwarding processing unit 12. Using the connection established in the process 1009, the data forwarding processing unit 12 forwards the request 50 to the server apparatus 2. At this time, as necessary, the data forwarding processing unit 12 sets priority information corresponding to the process privilege 59 in an IP packet of data to be forwarded (process 1010).

When receiving the request 50 the server apparatus 2 processes the request 50 and returns a response 60 using the connection established in the process 1009 (process 1011).

In the data communication forwarding apparatus 3, the data forwarding processing unit 12 receives the response 60 and forwards the received response 60 to the client apparatus 1 via the connection established in the process 1002. At this time, as necessary, the data forwarding processing unit 12 sets priority information corresponding to the process privilege 59 in the forwarded IP packet data and forwards the data (process 1012).

The client apparatus 1 receives the response 60 and displays the received response 60 (process 1013).

After completion of transmission of the response 60, the server apparatus 2 disconnects the connection established in the process 1009 (process 1014).

In response to the disconnection of the connection of the server apparatus 2, the data forwarding processing unit 12 of the data communication forwarding apparatus 3 returns control to the connection forwarding processing unit 11, the connection forwarding processing unit 11 disconnects the connection established in the process 1009. After completion of response forward to the client apparatus 1, the connection forwarding processing unit 11 also disconnects the connection established in the process 1002 (process 1015).

In the data communication forwarding apparatus 3, further, when the connection management table entry 20 corresponding to the connection established in the process 1009 is present, the connection forwarding processing unit 11 passes control to the connection management processing unit 13. The connection management processing unit 13 in turn decreases the value of the connection number field 24 of the connection management table entry 20 by 1 and transmits its connection decrease event to the request queuing processing unit 14 (process 1016).

When another request 50 is already queued in the request queue 28 of the connection management table entry 20 associated with the decreased connection, the request queuing processing unit 14, after receiving the connection decrease event, extracts the request 50 from the request queue 28, and resumes the processing of the request 50 queued and already put in its wait state in the process 1007 (process 1017).

When receiving the disconnection by the process 1015, the client apparatus 1 also disconnects the connection and terminates the request processing (process 1018).

Figure 6:
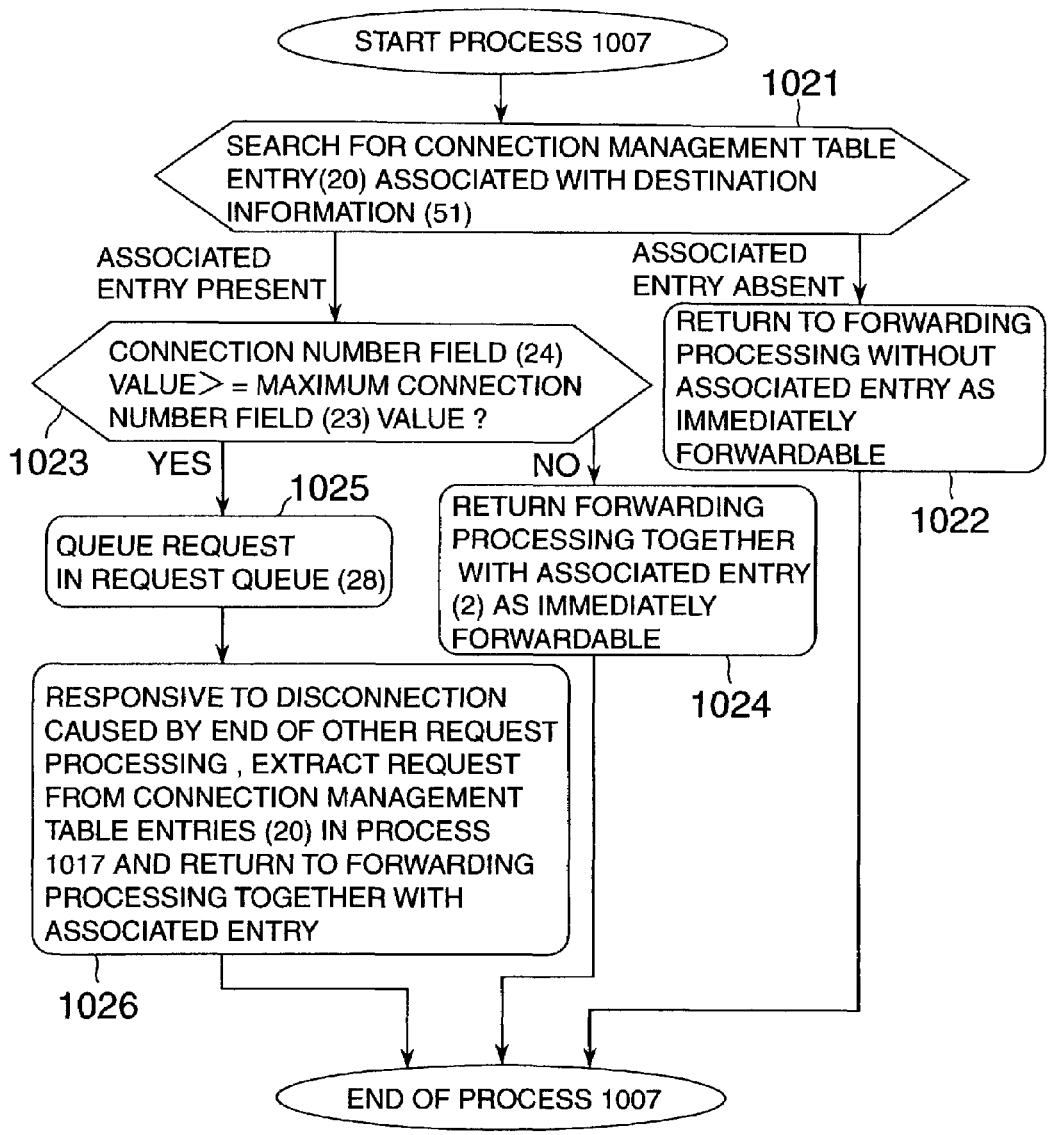
FIG. 6 is a flowchart showing a flow of request queuing operations of a process 1007 of request queuing operations of FIG. 5 in the present embodiment.

Shown in FIG. 6 is a flowchart showing an example of request queuing operations of the request queuing processing unit 14 in the process 1007 in FIG. 5.

The request queuing processing unit 14, when receiving the request 50 and destination information 51 from the connection forwarding processing unit 11, first searches the connection management table 16 for the connection management table entry 20 to know whether or not the entry 20 associated with the destination is present. More specifically, the request queuing processing unit 14 compares the destination information 51 with the destination field 21 of each entry 20 of the connection management table 16, and the destination information 51 is present or absent in each entry 20 of the server apparatus or apparatuses these address are indicated in the destination field 21 (process 1021).

As a result, if the corresponding connection management table entry 20 is not present, then the immediate forward of the request 50 is possible. Thus the request queuing processing unit 14 returns the request 50, destination information 51 and the fact of absence of the corresponding entry to the connection forwarding processing unit 11 to execute the connection request forwarding operation (process 1022).

In the case of presence of the corresponding connection management table entry 20, the request queuing processing unit 14 compares the value of the connection number field 24 of the entry 20 with the value of the maximum connection number field 23 (process 1023).

As a result, if the value of the connection number field 24 is less than the value of the maximum connection number field 23, then the immediate forward of the request 50 is possible. Thus the request queuing processing unit 14 returns the request 50 and destination information 51 to the connection forwarding processing unit 11 together with the entry 20 to execute the connection request forwarding operation (process 1024).

When the value of the connection number field 24 is not larger than the value of the maximum connection number field 23, the request queuing processing unit 14 queues the request 50 and destination information 51 in the request queue 28 of the entry 20, and makes the forward of the request 50 waiting until the connection decrease event causes the request 50 to be extracted from the request queue 28 in the process 1017 of FIG. 5 (process 1025).

When a connection with a server apparatus is disconnected, in the process 1017 of FIG. 5, the request queuing processing unit 14 extracts the request 50 from the request queue 28 of the connection management table entry 20 corresponding to the connection, and returns the extracted request 50 and destination information 51 to the connection forwarding processing unit 11 together with the entry 20 to executed the connection request forwarding operation (process 1026).

Figure 7:
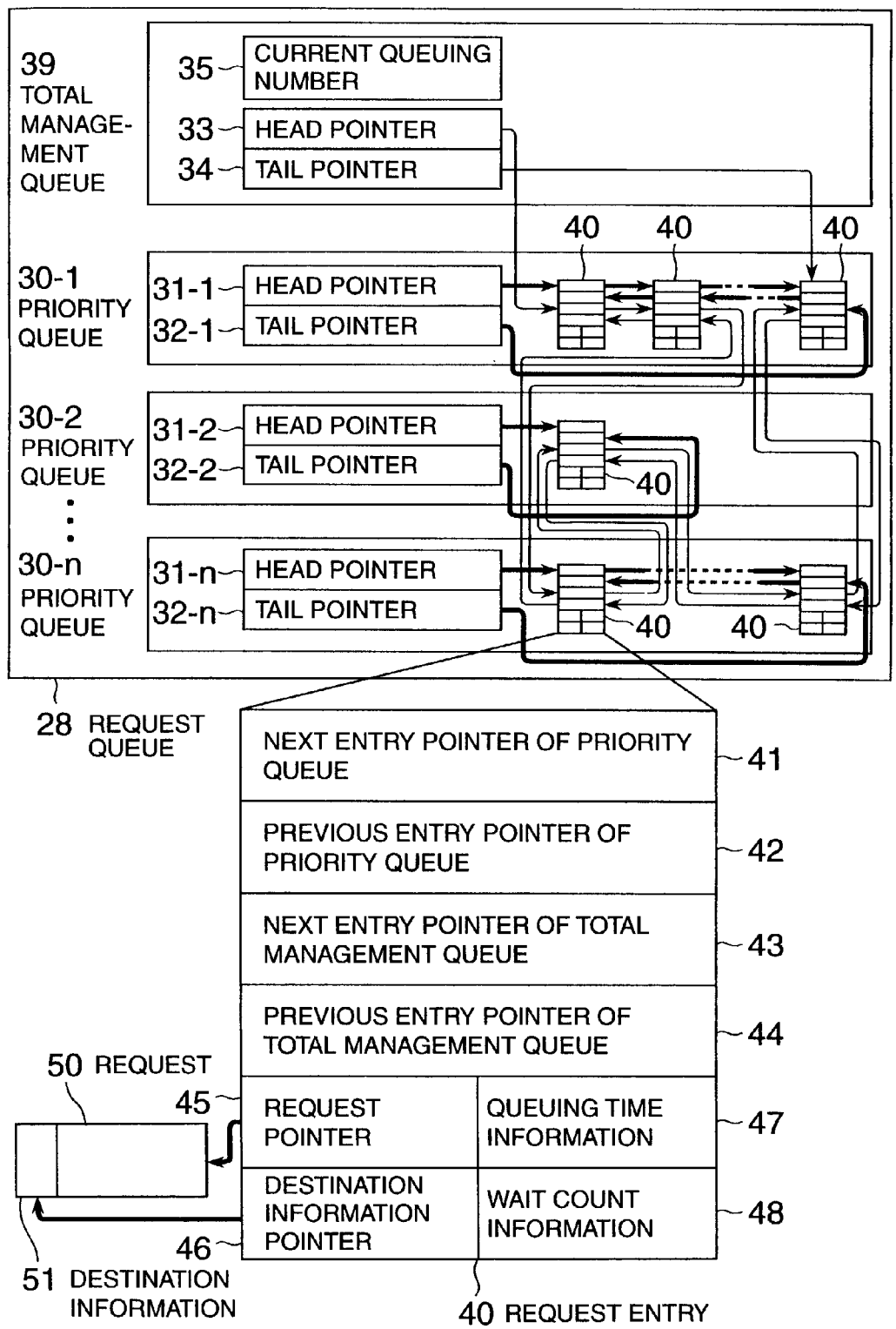
FIG. 7 is a structure of a request queue in a connection management table where a priority queue was implemented in the present embodiment.

FIG. 7 shows a structure of a request queue 28 in the connection management table of the present embodiment realizing a priority queue. The request queue 28 of the connection management table 16 in FIG. 4 can be arranged as a single queue. In FIG. 7, however, a plurality of queues are used to realize queuing based on the priority. That is, the request queuing processing unit 14 performs its queuing operation according to the processing priorities 59 of 1 to n set for the requests 50 by the privilege mapping processing unit 15, to extract the requests from the queues according to the priority order and to process the requests in an decreasing order of priorities. In the embodiment of FIG. 7, a function (anti-starvation function) of preventing such a situation is realized that the request having a low priority is overtaken one after another by the request later arrived but having a high priority and cannot receive the service for a long time.

The request queue 28 of the example of FIG. 7 is conceptionally is made of n priority queues 30-1 to 30-n and a single overall queue 39. The priority queues 30-1 to 30-n are queues associated with the priorities 1 to n of the requests 50, while the total management queue 39 is a queue of all requests currently already queued and arranged in an arrival order. When the request 50 is queued, each request 50 is placed on the last tail of the priority queue 30 associated with the priority of the request 50, and the same request 50 is also placed on the last tail of the overall queue 39.

In the example of FIG. 7, for the purpose of facilitating insertion of the request in the queue and deletion therefrom, the priority queues 30-1 to 30-n and overall queue 39 all manage the queues based on a double link list. More in detail, in order to handle the heads and tails of the priority queues 30-1 to 30-n and overall queue 39, head pointers 31-1 to 31-n and tail pointers 32-1 to 32-n of the priority queues as well as a head pointer 33 and a tail pointer 34 of the overall queue are provided, each of request entries 40 queued has a next entry pointer 41 and previous entry pointer 42 of the priority queue, a next entry pointer 43 and a previous entry pointer 44 of the overall queue, and the pointers are used to point the request entries 40's previous and next points to each of the priority and overall queues. When the request entry 40 to be pointed is absent, value NULL is set in these pointers to indicate that there is no entry to be pointed. Further, a current queuing number field 35 is provided to hold a total number of request entries 40 already queued in the overall queue 39. Each request entry 40 further has, in addition to a request pointer 45 which points the queued request 50, a destination information pointer 46 which points the destination information 51 of the request, and in this example, also has a queuing time information 47 which indicates a queued time. In this example, furthermore, each request entry 40 also has wait frequency information 48 which holds the count of the request overtaken by the other request.

Figure 8:
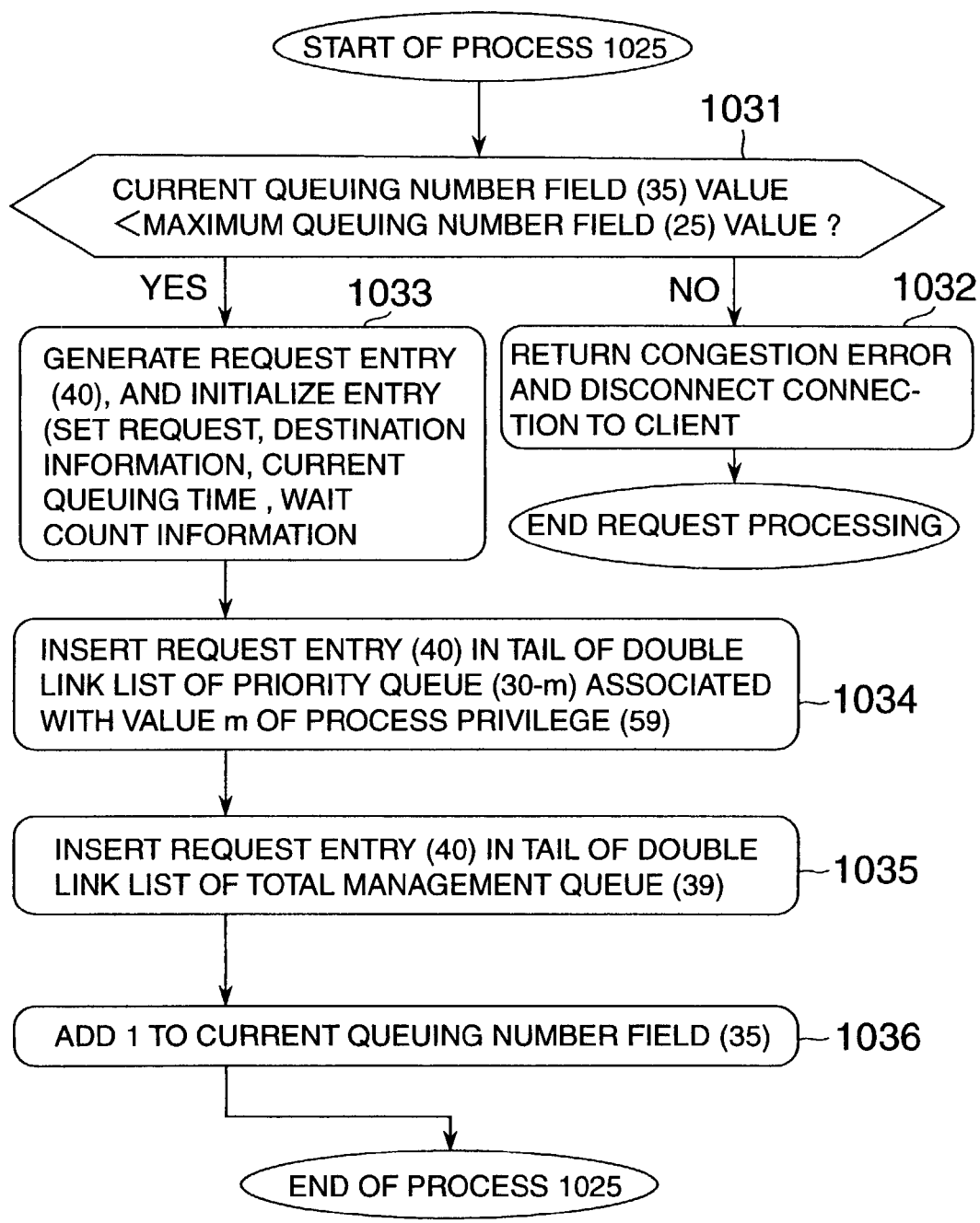
FIG. 8 is a flowchart showing the queuing operation of a process 1025 using the request queues of FIG. 7 in the present embodiment.
Figure 9:
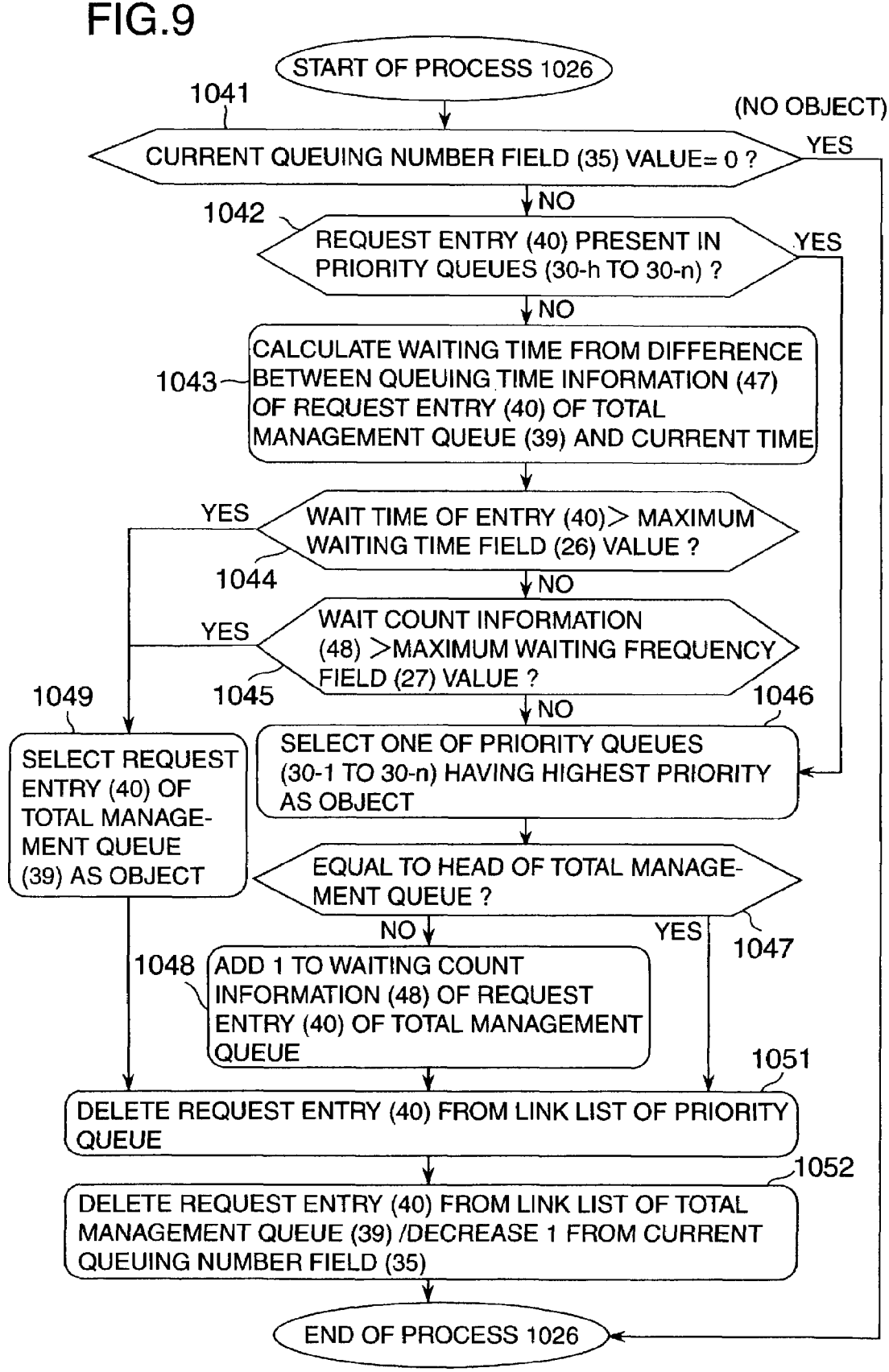
FIG. 9 is a flowchart showing the extracting operations of a process 1026 from the request queue using the request queues of FIG. 7 in the present embodiment.

FIGS. 8 and 9 show a flowchart of queuing operations of the process 1025 and a flowchart of request extracting operations of the process 1026 from the request queue using the request queue in FIG. 7, respectively.

In the queuing operation of FIG. 8, the request queuing processing unit 14 first examines the current queuing number field 35 to know whether or not the current queuing number is less than the value of the maximum queuing number field 25 of the entry 20 (process 1031).

When the current queuing number is not less than the value of the maximum queuing number field 25, the request queuing processing unit 14 returns an error indicative of the current congestion state and service impossibility to the client apparatus 1 via the connection established in the process 1002, and disconnects the connection to terminate the operation of the data communication forwarding apparatus 3 to the same request 50 (process 1032).

When the current queuing number is less than the value of the maximum queuing number field 25, the request queuing processing unit 14 generates a new request entry 40, and the connection management processing unit 13 initializes the fields of the same entry on the basis of the passed request 50, destination information 51, etc. More specifically, the request queuing processing unit 14 sets the service request 50 and destination information 51 in the request pointer 45 and destination information pointer 46, sets a current time in the queuing time information 47, and initializes the wait frequency information 48 at zero (process 1033).

Next, the request queuing processing unit 14 places the generated request entry 40 in the last tail pointed by the tail pointer 32-m of the priority queue 30-m associated with the value m of the process privilege 59 of the same request 50, and correctly sets the head pointer 31-m and tail pointer 32-m of the priority queue 30-m and the next entry pointer 41 and previous entry pointer 42 of the request entry 40 (process 1034).

The request queuing processing unit 14 further places the generated request entry 40 in the tail pointed by the tail pointer 34 of the overall queue 39, and correctly sets the head pointer 33 and tail pointer 34 of the overall queue 39 and the next entry pointer 43 and previous entry pointer 44 of the total management queue of the request entry 40 (process 1035).

Finally, the request queuing processing unit 14 increases the value of the current queuing number field 35 and terminates the queuing operation (process 1036).

In the request extracting operation from the request queue in FIG. 9, on the other hand, the request queuing processing unit 14 first examines the current queuing number field 35 of the corresponding connection management table entry 20 to examine whether or not the value of the current queuing number field 35 is zero (process 1041).

When the value of the current queuing number field 35 is zero, the request queuing processing unit 14 terminates the request extracting operation, since no request is queued.

When the value of the current queuing number field 35 is other than zero, the request queuing processing unit 14 examines whether or not there is a request entry 40 in the priority queues 30-h to 30-n having priorities of h which value is determined by the system or higher (process 1042).

If there is a corresponding request entry 40, then the request queuing processing unit 14 jumps to a process 1046.

If not, then the request queuing processing unit 14 calculates a waiting time on the basis of a difference between the queuing time information 47 of the request entry 40 pointed by the head pointer 33 of the overall queue and the current time (process 1043).

Next, the request queuing processing unit 14 compares the calculated waiting time with the value of the maximum waiting time field 26 (process 1044).

When the calculated value exceeds the value of the maximum waiting time field 26, the request queuing processing unit 14 jumps to a process 1049.

When the waiting time is less than the value of the maximum waiting time field 26, the request queuing processing unit 14 compares the waiting count information 48 of the request entry 40 with the value of the maximum waiting count field 27 (process 1045).

When the value of the waiting count information 48 of the request entry 40 is larger, the request queuing processing unit 14 jumps to a process 1049.

If not, then the request queuing processing unit 14 goes to a process 1046.

In the process 1046, the request queuing processing unit 14 examines the head pointers 31-1 to 31-n of the priority queues 30-1 to 30-n and uses the request entry 40 having the highest priority as an objective entry (process 1046).

The request queuing processing unit 14 examines whether or not the obtained object entry is equal to the request entry 40, which is pointed by the total management queue's header pointer 33. If equal, the request queuing processing unit 14 jumps to a process 1051 (process 1047).

If not equal, the request queuing processing unit 14 adds one to the value of the waiting frequency information 48 of the request entry 40 pointed by the head pointer 33 and jumps to a process 1051 (process 1048).

When the waiting time and waiting count of the head entry 40 of the overall queue 39 exceed their upper limit values, the request queuing processing unit 14 uses the same entry as the object entry and jumps to the process 1051 (process 1049).

In the process 1051, the request queuing processing unit 14 extracts the object request entry 40 obtained in the above process from the corresponding priority queue 30-m, and correctly updates the head pointer 31-m of the priority queue 30-m, the tail pointer 32-m, and the next and the previous entry pointers 41 and 42 of the priority queue of the request entry 40 (process 1051).

Similarly, the request queuing processing unit 14 extracts the object request entry 40 from the overall queue 39, and correctly updates the head and the tail pointers 33 and 34 of the overall queue 39 and the next and the previous entry pointers 43 and 44 of the overall queue of the request entry 40. Further, the processing unit 14 decreases the value of the current queuing number field 35 by 1 and terminates the request extracting operation from the request queue (process 1052).

The embodiment of FIGS. 3 to 9 has effects that the simultaneous request processing number can be limited and the request having a high priority can be first processed. Further, the present embodiment has an effect that even in the case where there is a request having a low priority, if the request is made waiting for a predetermined time or more or overtaken by a predetermined frequency, then the low-priority request can be processed in spite of the presence of a request having a high priority. The present embodiment has another effect that a request having a priority of a certain level or more can be processed always in the priority order, in spite of the fact that there is another request which has a long waiting time or much waiting frequency.

In the example of FIGS. 4 and 6, explanation has been made for simplicity on the assumption that the number of connection management table entries 20 associated with the request destination is at most one. Explanation will be made in connection with an embodiment where a plurality of entries are associated for the request destination.

FIG. 10 shows another structure of the connection management table 16 in the present embodiment. In the embodiment, in addition to the example of FIG. 4, an application priority information field 201 and an internal precedence information field 202 are added to each entry 20.

The application priority information field 201 is a field for limiting the applicable connection management table entries 20 on the basis of the request process privilege 59. When the application priority information field 201 is specified, only entries 20 containing the value of the request process privilege 59 are applicable.

The internal precedence information field 202 is a field indicative of a selection sequence between entries. When there are connection management table entries 20 associated with the request destination, one of the entries having the largest field 202 is selected.

Figure 11:
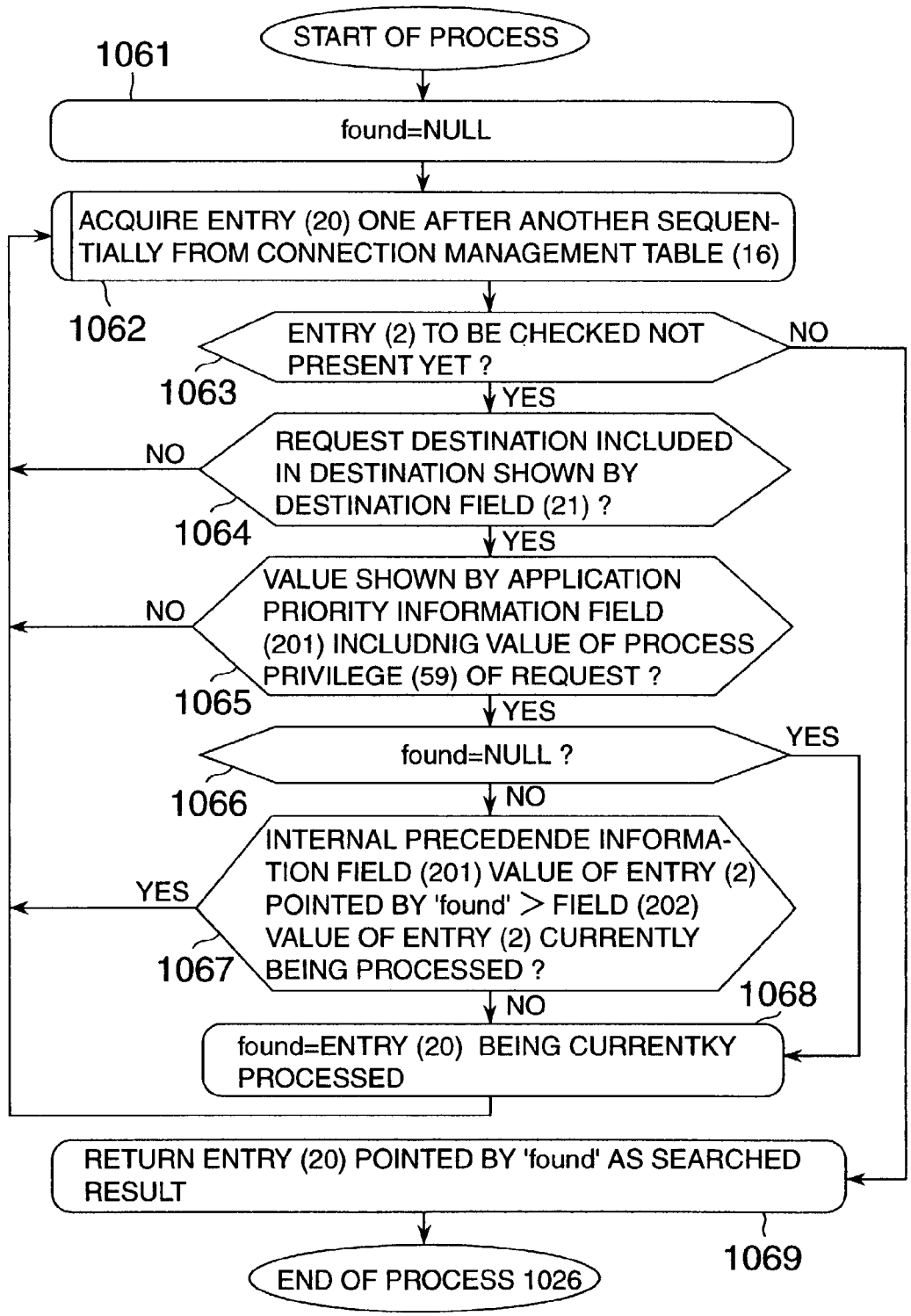
FIG. 11 is a flowchart showing operations of searching for a connection management table entry associated with a destination of a request in a process 1021 of FIG. 6 when the connection management table of FIG. 10 of the present embodiment is used.

FIG. 11 shows a flowchart of searching operations of the connection management table entry 20 associated with the request destination in the process 1021 of FIG. 6 when the connection management table 16 of FIG. 10 is used.

The request queuing processing unit 14 first sets a value NULL indicative of none in a variable 'found' pointing the found connection management table entry (process 1061).

Next, the request queuing processing unit 14 extracts the connection management table entries 20 from the connection management table 16 sequentially one after another (process 1062).

After examined all the entries of the connection management table 16, the request queuing processing unit 14 jumps to a process 1069 (process 1063).

Then the request queuing processing unit 14 examines whether or not the destination shown in the destination information 51 of the request is included in the destination shown in the destination field 21 of the extracted entry 20 (process 1064).

If not included, then the processing unit 14 returns to the process 1062.

If included, then the request queuing processing unit 14 examines whether or not the value of the application priority information field 201 of the entry 20 includes the value of the process privilege 59 of the request (process 1065).

If the field value does not include the value of the request process privilege 59, then it mean that it is not applicable and thus the processing unit 14 returns to the process 1062.

Next the processing unit 14 examines the variable 'found' and if it is NULL, then the processing unit 14 jumps to a process 1068 (process 1066).

The processing unit 14 compares the value of the entry 20 extracted in the process 1062 with the value of the internal precedence information field 202 of the entry 20 pointed by the variable 'found' (process 1067).

If the value of the internal precedence information field 202 of the entry pointed by the variable 'found' is larger, then the processing unit 14 returns to the process 1062.

The request queuing processing unit 14 selects the entry 20 extracted in the process 1062 as a new selected entry, changes the entry to be pointed by the variable 'found', and returns to the process 1062 (process 1068).

As a result of the above operation, the request queuing processing unit 14 selects the connection management table entry 20 pointed by the variable 'found' as a corresponding entry and terminates the searching operation (process 1069).

In accordance with the present embodiment, since another communication path can be selected for each process privilege or the definition of a group of destinations and the definition of each destination can be both used, complicated definition can be possible with a less number of connection management entries.

In the foregoing embodiment, explanation has been made in connection with the example wherein the maximum and current connection numbers 23 and 24 are managed in the connection management table entry 20 to control queuing to the request queue 28 according to the number of connections to a destination. However, the maximum and current connection numbers for each priority queue may be managed in the connection management table entry 20 to control the queuing according to the number of connections for each priority.

In the case of the method for controlling the queuing according to the number of connections in each priority, in the processes 1008 and 1016 at the time of increasing or decreasing the number of connections, not only the value of the connection number field 24 is increased or decreased, but even the current connection number information for each process privilege to be newly managed by the connection management table entry 20 is also increased or decreased according to the request process privilege 59.

In the queuing judgement process 1023, further, the request queuing processing unit 14 not only performs comparison between the fields 23 and 24 of the connection management table entry 20 but also performs similar comparison even for the maximum and current connection number information for each newly-provided priority, and when any one of the above conditions is satisfied, the processing unit 14 queues the request.

In addition, at the time of extracting the request from the request queue 28, the processing unit 14 only extracts the entry 40 of the priority queue for which the current connection number is less than the maximum connection number in each priority. In the processing flow of FIG. 9, the request queuing processing unit 14, prior to the operation of the process 1042, examines the request entry 40 of the overall queue 39. When the entry 40 fails to satisfy the above conditions, the request queuing processing unit 14 proceeds to a process 1046 to search for the priority queue and to extract the request therefrom. Even at the time of examining the entry 40 on the priority queue in the processes 1042 and 1046, if the entry 40 fails to satisfy the above conditions, then the processing unit 14 jumps to search for another priority queue.

Explanation will next be made as to how the privilege mapping processing unit 15 sets the request process privilege 59.

FIG. 12 shows a structure of an address/process privilege conversion table 110 used in an embodiment wherein the process privilege 59 is found based on the address of the client apparatus 1 and the address of the destination server apparatus. The address/process privilege conversion table 110 of the present embodiment includes a client address field 111, a server address field 112 and a process privilege field 113. The client and server address fields 111 and 112 are fields indicative of the address of the requested client apparatus 1 and of the address of the request destination server apparatus 2 respectively, and which can specify not only a specific address but also wildcard indicative of any address by mark '*'. Further, the process privilege field 113 is defined the value of the process privilege allocated for a request when the request's included addresses equal a pair of the client address field 111 and server address field 112.

The privilege mapping processing unit 15, using the address/process privilege conversion table 110, finds a matching entry from the requested client address and the destination information 51 of the request 50, and finds the process privilege 59 using the value of the process privilege field 113.

In the present embodiment, the privilege mapping processing unit 15 can set the process privilege depending on the client address or the destination address.

Figures 14, 15:
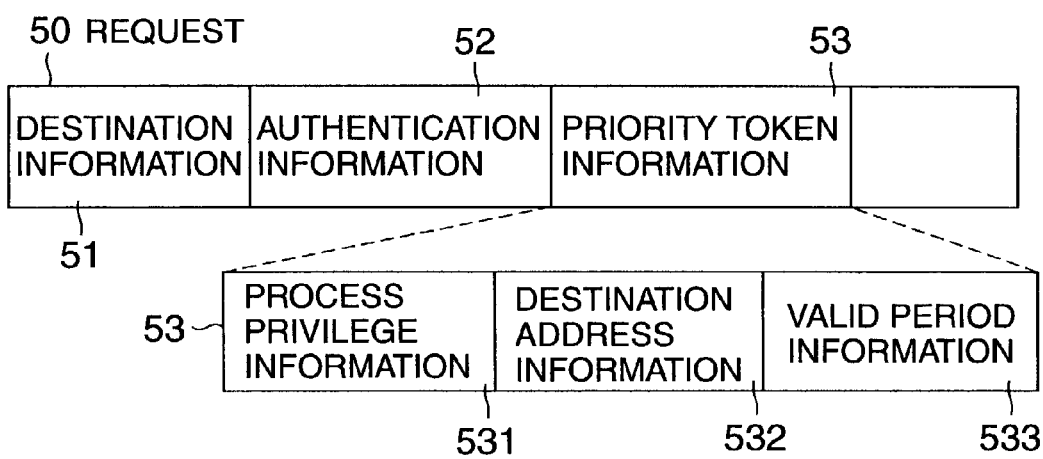
FIG. 14 is a structure of a user/process privilege conversion table to find a process privilege from user's authentication information in the present embodiment.
FIG. 15 is a structure of a request using priority token information in the present invention.

FIGS. 13 and 14 show another example of finding a process privilege from user's authentication information. FIG. 13 shows an example of a structure of the request 50 from the client apparatus 1.

In this example, in addition to the destination information 51, user's authentication information 52 is added.

FIG. 14 shows a structure of a user/process privilege conversion table 120 to find the process privilege 59 from user's authentication information 52. The user/process privilege conversion table 120 in this example includes a user's authentication information field 121 and a process privilege field 122. The privilege mapping processing unit 15 finds an entry for which the user's authentication information field 121 matches the user's authentication information 52 from the user's authentication information 52 included in the request 50 using the user/process privilege conversion table 120, and finds the process privilege 59 using the value of the process privilege field 122 of the same entry.

In this example, the process privilege can be set for each user.

In another example of setting the request process privilege, priority token information 53 including the process privilege information in the request 50 is used.

FIG. 15 shows an example of the request 50 in the example using the priority token information 53. In this example, when compared to the conventional request 50, the request includes the priority token information 53. The priority token information 53 has process privilege information 531, destination address information 532 indicative of the address or addresses of the destination server apparatus or apparatuses to which the process privilege is applied, and valid period information 533 indicative of an application valid period of the process privilege. With regard to the priority token information 53, the data communication forwarding apparatus 3 first returns a response 60 including the priority token information 53 to the client apparatus 1. The client apparatus 1 in turn when receiving the response 60 stores the priority token information 53, and before issuing a request to the same destination, attaches the priority token information 53 to the request 50 and then issues it thereto. The priority token information 53 is, for example, encrypted to prevent doctoring or tampering of the information 53 by the client apparatus 1.

Figure 16:
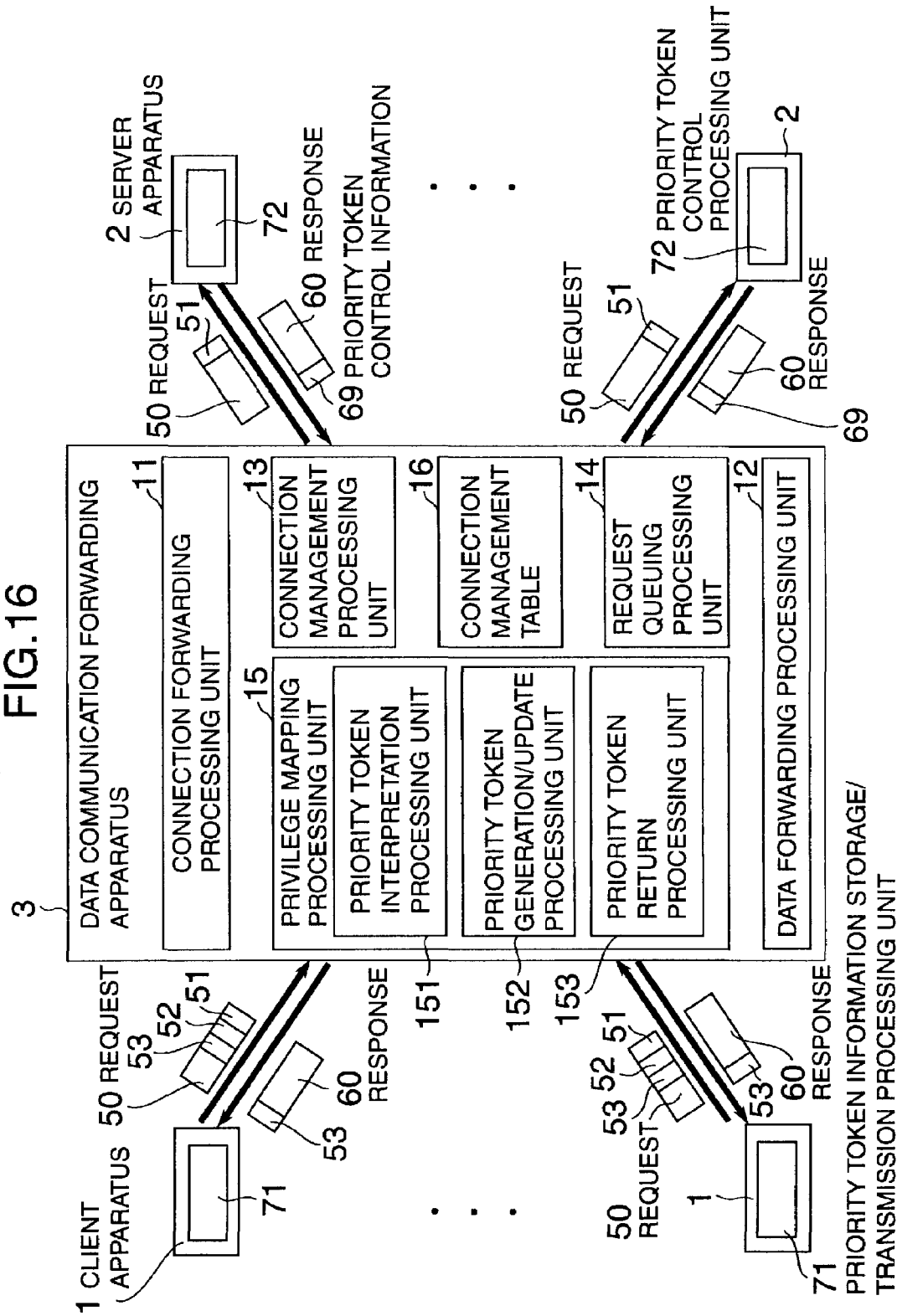
FIG. 16 is a configuration of a system using the priority token information in the present embodiment.

FIG. 16 shows a configuration of a system using the priority token information 53. In the present embodiment, the data communication forwarding apparatus 3 includes, as part of the privilege mapping processing unit 15, a priority token interpretation processing unit 151, a priority token generation/update processing unit 152, and a priority token return processing unit 153. The client apparatus 1 has a priority token information storage/transmission processing unit 71. The priority token information storage/transmission processing unit 71, like a Web cookie function, stores the priority token information 53 returned from the data communication forwarding apparatus 3 in the destination as associated with the destination and, before transmitting the request 50 to the data communication forwarding apparatus 3, attaches the priority token information 53 stored as associated with the destination of the request to the request 50, and then transmits it.

For example, as a specific example, in a Web page access, Cookie function can be used to perform transaction of the priority token information between the client apparatus 1 and data communication forwarding apparatus 3. The client apparatus 1, if having information called cookie associated with the destination server apparatus 2, establishes a connection to the data communication forwarding apparatus 3, attaches the cookie to request data (HTTP header), and transmits it in a form which follows.

GET http://xxx/yyy/zzz HTTP/1.1
Cookie: Priority token information+Server cookie information The above cookie includes the information which the data communication forwarding apparatus 3 transmitted to the client apparatus 1 as a response to a request previous to this request. In the present embodiment, in the case of presence of the priority token information and the cookie information returned from the destination server apparatus 2, the above cookie also contains the cookie information of the same server.

The data communication forwarding apparatus 3, after establishing a connection to the client apparatus 1, accepts the above data, interprets the priority token information in the above cookie, and converts the information to a priority. Thereafter, the data communication forwarding apparatus 3, when able to issue a request to the server after queuing the request according to the priority, forwards the connection to the server, removes the priority token information 53 to be directed to the data communication forwarding apparatus from the received cookie header, and transmits a request containing the cookie information of the server to the server apparatus 2. In the case of absence of the server cookie information, the data communication forwarding apparatus 3 removes the cookie header from the received cookie header and transmits it.

At the time of returning a response, the data communication forwarding apparatus 3 attaches the priority token information 53 associated with the destination to the server cookie information in the HTTP header of the response returned from the server apparatus 2 using Set-Cookie, and returns the attached cookie information to the client apparatus 1, as shown below.

HTTP/1.1
OK
Set-Cookie:
Destination=Priority token information+Server cookie information
Content-Length:nnn
Content body When the server cookie information by the Set-Cookie header is absent in the response from the server apparatus 2, the data communication forwarding apparatus 3 attaches the Set-Cookie header containing the priority token information 53 associated with the destination to the response and returns it to the client apparatus 1.

As an option, the server apparatus 2 may include a priority token control processing unit 72 which controls the operation of the priority token interpretation processing unit 151 in the data communication forwarding apparatus 3. The priority token control processing unit 72 attaches priority token control information 69 to the response 60 of the processed result to the request 50 and returns it to thereby control the operation of the priority token interpretation processing unit 151 in the data communication forwarding apparatus 3.

Figure 17:
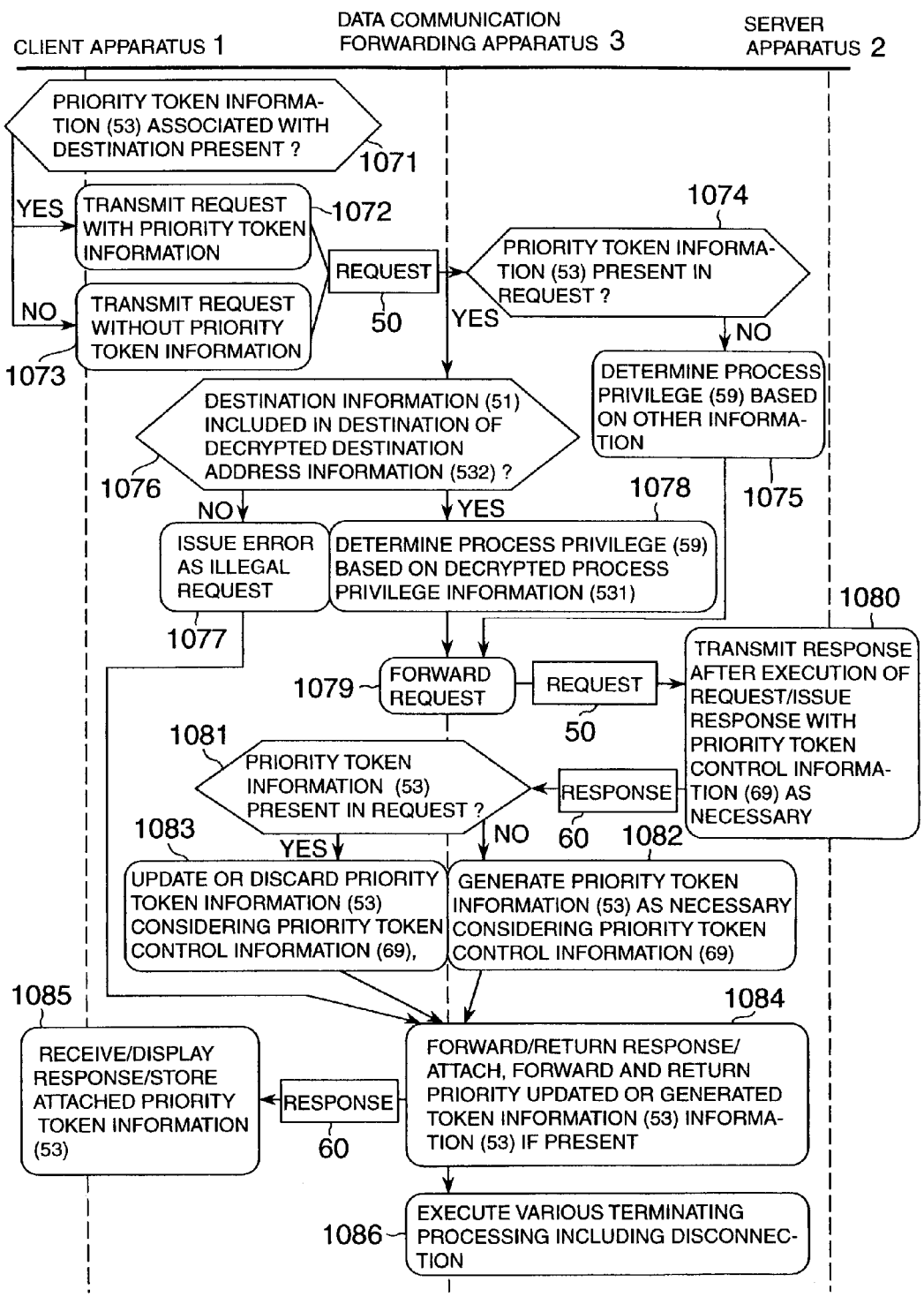
FIG. 17 is a flowchart showing request operations using the priority token information in the present embodiment.

FIG. 17 shows a flowchart of request processing operations using the priority token information 53.

First of all, when the client apparatus 1 transmits the request 50 in the process 1003 through the processes 1001 and 1002, the priority token information storage/transmission processing unit 71 examines whether or not the priority token information 53 associated with the destination is already stored in the request 50 (process 1071).

When the corresponding priority token information 53 is present, the priority token information storage/transmission processing unit 71 attaches the priority token information 53 to the priority token information 53 and then transmits it (process 1072).

When the corresponding priority token information 53 is not present, the priority token information storage/transmission processing unit 71 transmits the request 50 as it is (process 1073).

The data communication forwarding apparatus 3 receives the request 50 in the process 1004. And the data communication forwarding apparatus 3 determines the process privilege 59 in the process 1005, the priority token interpretation processing unit 151 of the privilege mapping processing unit 15 examines whether or not the priority token information 53 is attached to the request 50 from the client apparatus 1 (process 1074).

When the priority token information 53 is not attached, the priority token interpretation processing unit 151 determines the process privilege 59 using the other information by such a method as in the examples of FIGS. 12, 13 and 14, and jumps to a process 1079 (process 1075).

When the priority token information 53 is attached, the priority token interpretation processing unit 151 decrypts the encrypted priority token information 53, and examines whether or not the request destination information 51 is included in the destination shown by the destination address information 532 of the decrypted priority token information 53 (process 1076).

When the destination of the request is not included, the data communication forwarding apparatus 3 judges as an illegal request and jumps to a process 1084 to send an error response to the client apparatus 1 (process 1077).

When the destination of the request is included, the data communication forwarding apparatus 3 uses the value of the process privilege information 531 of the priority token information 53 as the process privilege 59 (process 1078).

The data communication forwarding apparatus 3 executes the processes 1006 to 1010 to forward the request 50 to the destination server apparatus 2 (process 1079).

In the server apparatus 2 when receiving the request 50 and returning a response 60 to the data communication forwarding apparatus 3 in the process 1011, the priority token control processing unit 72, as necessary, attaches the priority token control information 69 indicative of permission or non-permission of generation/update of the priority token information and of increase or decrease of the priority to the response, and then returns it (process 1080).

The data communication forwarding apparatus 3 after receiving the response 60, before forwarding the response 60 to the client apparatus 1 in the process 1012, again examines whether or not the priority token information 53 has been attached to the request 50 (process 1081).

When the priority token information 53 has not been attached, the priority token interpretation processing unit 151 generates the priority token information 53 under certain conditions based also on the instruction of the priority token control information 69 from the server apparatus 2 (process 1082).

When the priority token information 53 has been attached, the priority token interpretation processing unit 151 updates or discards the priority token information 53 under certain conditions based also on the instruction of the priority token control information 69 from the server apparatus 2 (process 1083).

Further, at the time of forwarding the response 60 to the client apparatus 1 in the process 1012, the priority token generation/update processing unit 152, when the priority token information 53 generated/updated by the priority token generation/update processing unit 152 is present, encrypts the priority token information 53, attaches the information to the response 60, and then returns it to the client apparatus 1 (process 1084).

The client apparatus 1 after receiving the response 60 displays the response received in the process 1013. And when the priority token information 53 is attached to the response 60, the priority token information storage/transmission processing unit 71 stores the priority token information 53 as associated with the destination (process 1085).

Last, the data communication forwarding apparatus 3 terminates various operations of the processes 1014 to 1018 including disconnection to terminate the processing of the request from the client apparatus 1 (process 1086).

Figure 18:
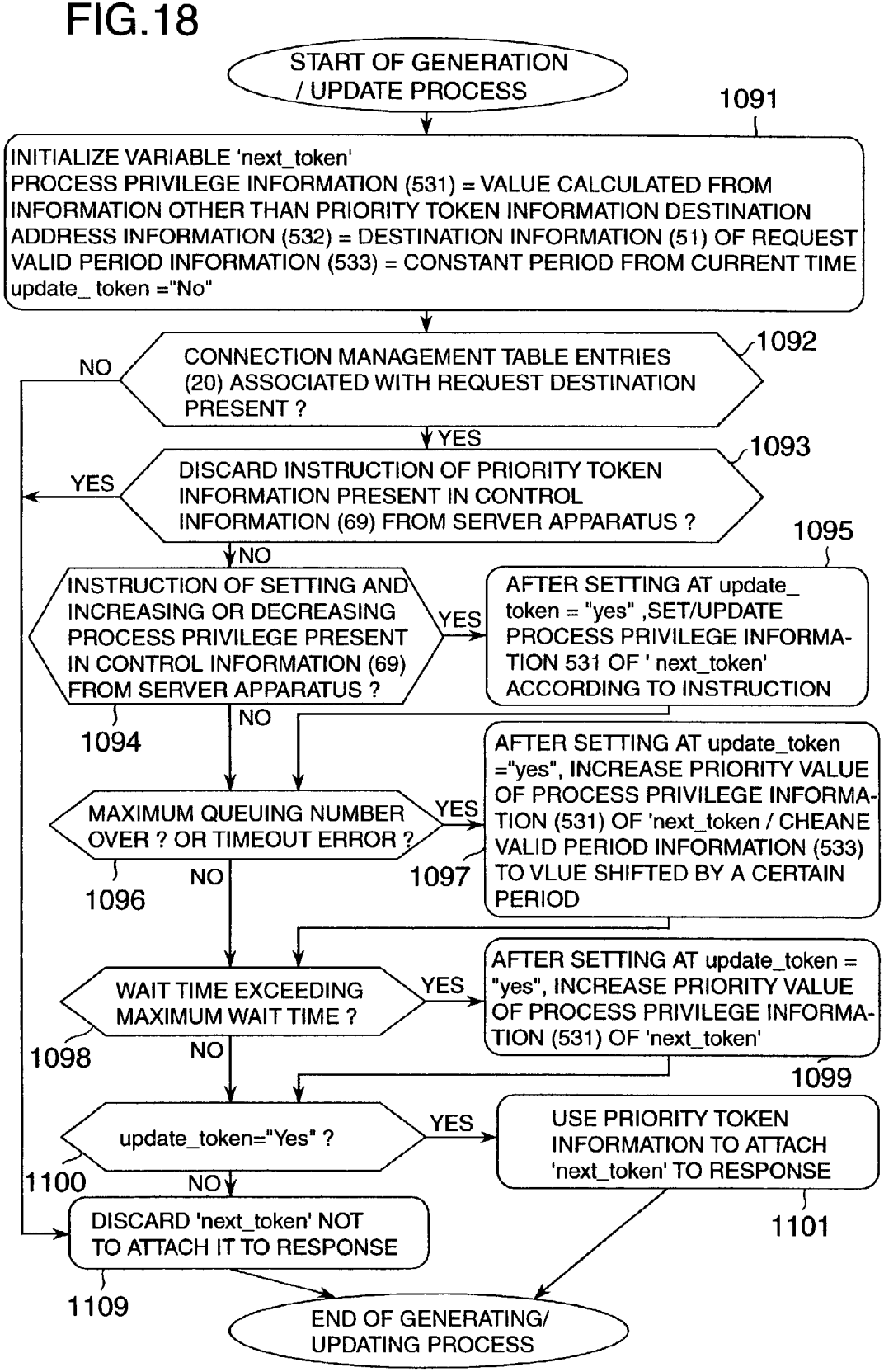
FIG. 18 is a flowchart showing the priority token generation/update processing operations of processes 1081 to 1083 in FIG. 17 in the present embodiment.

FIG. 18 shows a flowchart of generating/updating operations of the priority token information by the priority token generation/update processing unit 152 in the processes 1081 to 1083 in FIG. 17.

First of all, as initial values of the next priority token information 53 'next-token', the value of the process privilege found from information other than the priority token information within the request by such a method as in the example of FIGS. 12, 13 and 14 is set in the process privilege information 531; the destination information 51 of the request 50 is set in the destination address information 532; and valid period information indicative of being effective for a constant period of time from the current time. The priority token generation/update processing unit 152 sets a value "No" indicative of non-permission for a variable 'update_token' indicative of permission or non-permission of update of the priority token information (process 1091).

Next, the priority token generation/update processing unit 152 examines the presence or absence of the connection management table entry 20 corresponding to the request 50 (process 1092).

In the absence of the corresponding connection management table entry 20, the priority token generation/update processing unit 152 jumps to a process 1109.

Next when the priority token control information 69 is present in the response 60 from the server apparatus 2, the priority token generation/update processing unit 152 examines the presence or absence of an instruction to discard the priority token information (process 1093).

In the presence of the discard instruction, the priority token generation/update processing unit 152 similarly jumps to a process 1109.

Next when the priority token control information 69 is present in the response 60 from the server apparatus 2, the priority token generation/update processing unit 152 examines the presence or absence of an instruction to set the process privilege or to increase or decrease the process privilege (process 1094).

In the presence of the priority setting or increasing/decreasing instruction, the priority token generation/update processing unit 152 sets a variable 'update_token' at "No", and sets/updates the next priority token information 53 'next_token' according to the instruction (process 1095).

Further, in the request queuing process 1032 by the request queuing processing unit 14, the priority token generation/update processing unit 152 examines whether the request processing has so far resulted in a congestion error due to queuing beyond the maximum queuing number or in a receive timeout error of the response (process 1096).

In the case of the congestion error or the response receive timeout error, the priority token generation/update processing unit 152 sets the variable 'update_token' at "No" and sets the value of process privilege information 531 of the next priority token information 53 'next-token' at a higher priority value. The priority token generation/update processing unit 152 also changes the valid period information 533 of the 'next-token' to a value shifted by a blank period so that the information 533 becomes effective from a blank period and later (process 1097).

Further, in the request queuing process 1044 by the request queuing processing unit 14, the priority token generation/update processing unit 152 examines whether or not a waiting time exceeding the maximum wait time was detected (process 1098).

When the timeout of the waiting time was detected, the priority token generation/update processing unit 152 sets the variable 'update_token' for the '"&Yes";' and sets the value of the process privilege information 531 of the next priority token information 53 'next-token' at a higher priority value (process 1099).

Finally, the priority token generation/update processing unit 152 examines the value of the variable 'update_token' (process 1100).

When the value of the variable 'update_token' is 'No', the priority token generation/update processing unit 152 jumps to a process 1109.

When the value of the variable 'update_token' is '"&Yes";', the priority token generation/update processing unit 152 sets the 'next-token' as the priority token information 53 to be attached to the response, and terminates the generating/updating operations of the priority token (process 1101).

When judging through the above operations that the priority token information 53 should not be attached to the response 60, the priority token generation/update processing unit 152 discards the next priority token information 53 'next-token' and terminates the generating/updating operations of the priority token (process 1109).

In present embodiment, the user who inconveniently has been kept waiting for a long time or has received the congestion error can have the next process privilege. Further, in the congestion state, the embodiment can prompts the user to issue a request by selecting such a time as to get a higher priority in the form of a message, the congestion state can be advantageously restored at an early stage. Furthermore, the embodiment has an effect that the server apparatus can control the priority operation.

FIG. 19 shows another structure of the priority token information 53. In this example, the priority token information 53 includes, in addition to the process privilege information 531, destination address information 532 and valid period information 533 as shown in FIG. 15, any or a combination of an initial starting time information 534, priority token updating frequency information 535, a connection establishment count information 536 to the server apparatus, and total connection waiting time information 537.

FIG. 20 shows an exemplary structure of the connection management table 16 associated with the priority token information 53 of FIG. 19. In this example, the priority token updating condition information 29 showing the update conditions of the priority token information of the connection management table entry 20 includes an updatable period field 291, a maximum update count field 292, a maximum connection establishment number field 293, a prescribed connection establishment frequency field 294, and a prescribed connection wait time field 295. These fields indicate information about the maximum update period of the priority token information 53, the maximum updatable count, the maximum number of connections established to the server apparatus 2 allowing update of the priority token information 53, the minimum number of connections established to the server apparatus 2 necessary to increase the priority of the process privilege information of the priority token information 53, and the connection waiting time, respectively.

Figure 21:
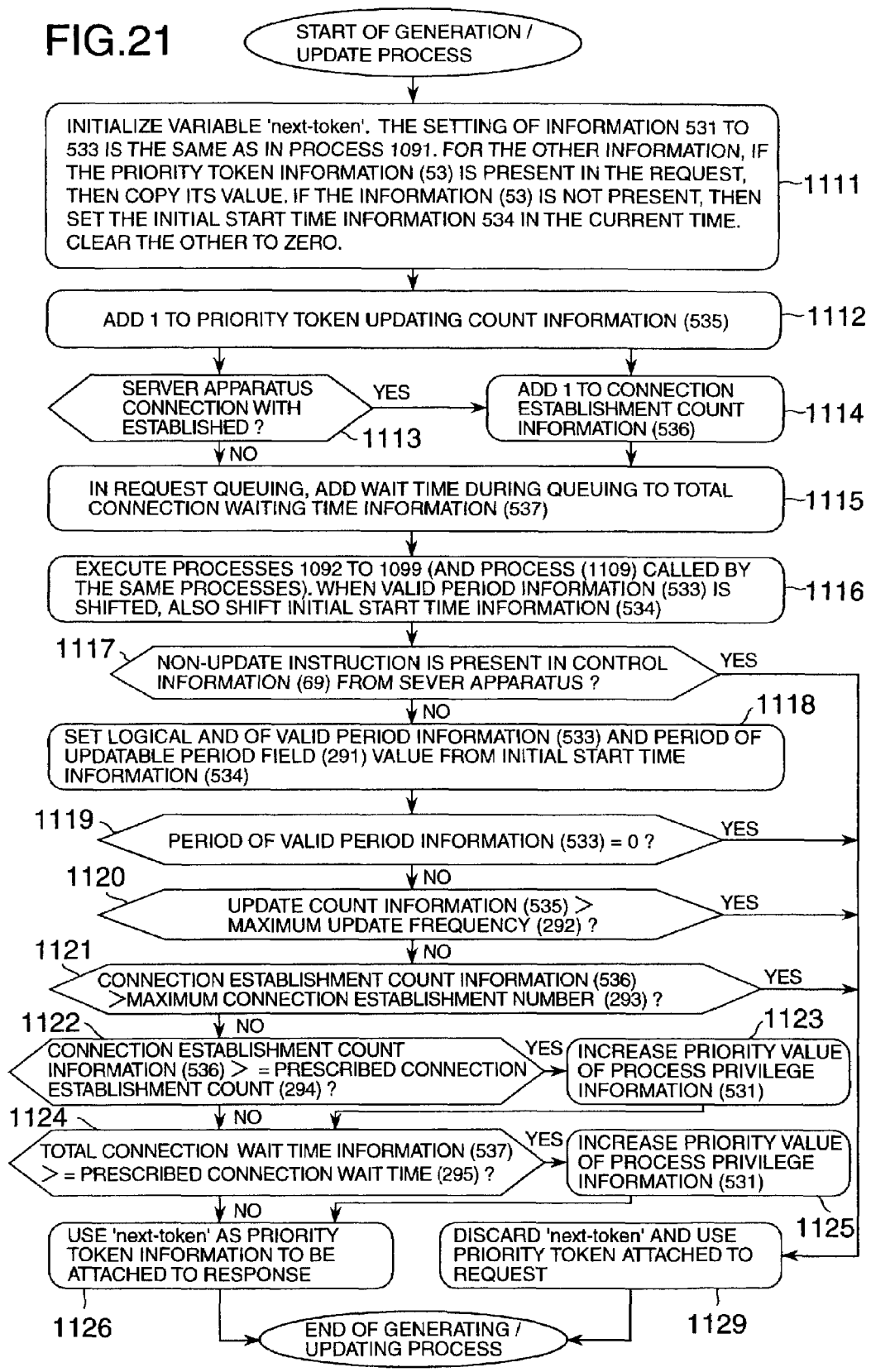
FIG. 21 is a flowchart showing the priority token information generating/updating operations of processes 1081 to 1083 in FIG. 17 when the priority token information of FIG. 19 of the present embodiment is employed.

FIG. 21 shows a flowchart of operations of generating and updating the priority token information by the priority token generation/update processing unit 152 in the processes 1081 to 1083 in FIG. 17, when the priority token information 53 in the example of FIG. 19 is used.

First of all, the priority token generation/update processing unit 152 sets the initial value of the next priority token information 53. More specifically, the priority token generation/update processing unit 152 initializes the process privilege information 531, destination address information 532, and valid period information 533 in a similar manner to in the process 1091. With respect to the newly added initial starting time information 534, priority token updating frequency information 535, connection establishment count information 536 and total connection waiting time information 537, if the priority token information 53 is attached to the current request, then the priority token generation/update processing unit 152 copies the corresponding values of the information. If the priority token information 53 is not attached, then the priority token generation/update processing unit 152 sets the current time for the initial starting time information 534 and sets zero for the other information (process 1111).

Next, the priority token generation/update processing unit 152 adds 1 to the priority token updating frequency information 535 'next-token' (process 1112).

The priority token generation/update processing unit 152 also examines the request 50 to know whether or not the connection to the server apparatus 2 was established (process 1113).

When the connection was established, the priority token generation/update processing unit 152 increments the value of the connection establishment count information 536 of the 'next-token' by 1 (process 1114).

Further, when the request is once queued and processed in the request queue 28 by the request queuing processing unit 14, the priority token generation/update processing unit 152 adds a difference between a time at which the request was extracted from the request queue in the process 1052 and the queuing time information 47 of the request entry 40 to the total connection wait time information 537 of the 'next-token' (process 1115).

Next, the priority token generation/update processing unit 152 executes the operations of generating/updating the 'next-token' in the processes 1092 and 1099. In this connection, however, when the process 1109 is called from the same process, the processing unit 152 also executes the process 1109. When the priority token information 53 was not attached to the request 50 and the valid period information 533 is shifted in the process 1097, the priority token generation/update processing unit 152 similarly shifts the initial starting time information 534 as well (process 1116).

Next, when the priority token control information 69 is present in the response 60 from the server apparatus 2, the priority token generation/update processing unit 152 examines the presence or absence of an instruction not to update the priority token information (process 1117).

In the presence of the non-update instruction, the priority token generation/update processing unit 152 jumps to a process 1129.

Next, the priority token generation/update processing unit 152 calculates a logical AND of the valid period information 533 of the 'next-token' and the period shown in the updatable period field 291 of the connection management table entry 20 associated with the request 50 from the time shown by the initial start time information 533 of the 'next-token' (process 1118).

Next, the priority token generation/update processing unit 152 examines whether or not the period shown by the valid period information 533 of the 'next-token' is not zero (process 1119).

If the valid period is zero, then the priority token generation/update processing unit 152 jumps to a process 1129.

The priority token generation/update processing unit 152 next examines whether or not the priority token updating frequency information 535 of the 'next-token' is not larger than the value of the maximum update frequency field 292 of the connection management table entry 20 associated with the request 50 (process 1120).

When the priority token updating frequency information 535 exceeds the maximum update frequency, the priority token generation/update processing unit 152 jumps to a process 1129.

Next, the priority token generation/update processing unit 152 examines whether or not the connection establishment frequency information 536 of the 'next-token' is not larger than the value of the maximum connection establishment number field 293 of the connection management table entry 20 associated with the request 50 (process 1121).

When the connection establishment frequency information 536 exceeds the maximum connection establishment number, the priority token generation/update processing unit 152 jumps to a process 1129.

Next the priority token generation/update processing unit 152 examines whether or not the connection establishment frequency information 536 of the 'next-token' is not smaller than the value of the prescribed connection establishment frequency field 294 of the connection management table entry 20 associated with the request 50 (process 1122).

When the connection establishment frequency information 536 is not smaller than the prescribed frequency, the priority token generation/update processing unit 152 sets the value of the process privilege information 531 of the 'next-token' at a higher priority value (process 1123).

Further, the priority token generation/update processing unit 152 examines the total connection waiting time information 537 of the 'next-token' is not smaller than the value of the prescribed connection waiting time field 295 of the connection management table entry 20 associated with the request 50 (process 1124).

When the total connection waiting time information 537 is not smaller than the prescribed waiting time, the priority token generation/update processing unit 152 sets the value of the process privilege information 531 of the 'next-token' at a higher priority value (process 1125).

Finally, the priority token generation/update processing unit 152 sets the 'next-token' as the priority token information 53 to be attached to the response and terminates the operations of generating/updating the priority token (process 1126).

When the updating of the priority token information is found impossible as a result of the aforementioned processing operations, the priority token generation/update processing unit 152 sets the priority token information 53 attached to the request 50 as the next priority token information 53 to be attached to the response as it is and to be returned, and terminates the operations of generating/updating the priority token. In this connection, when the priority token information 53 is not attached to the request 50, the priority token generation/update processing unit 152 does not attach the priority token information even to the response (process 1129).

In the above example, the process privilege can be increased according to the total access frequency to the server apparatus 2 or the total waiting time in a constant period of time. For example, when the server apparatus 2 once accepts a request from a user, the apparatus can process the request earlier than another new request during a constant period of time.

Figure 22:
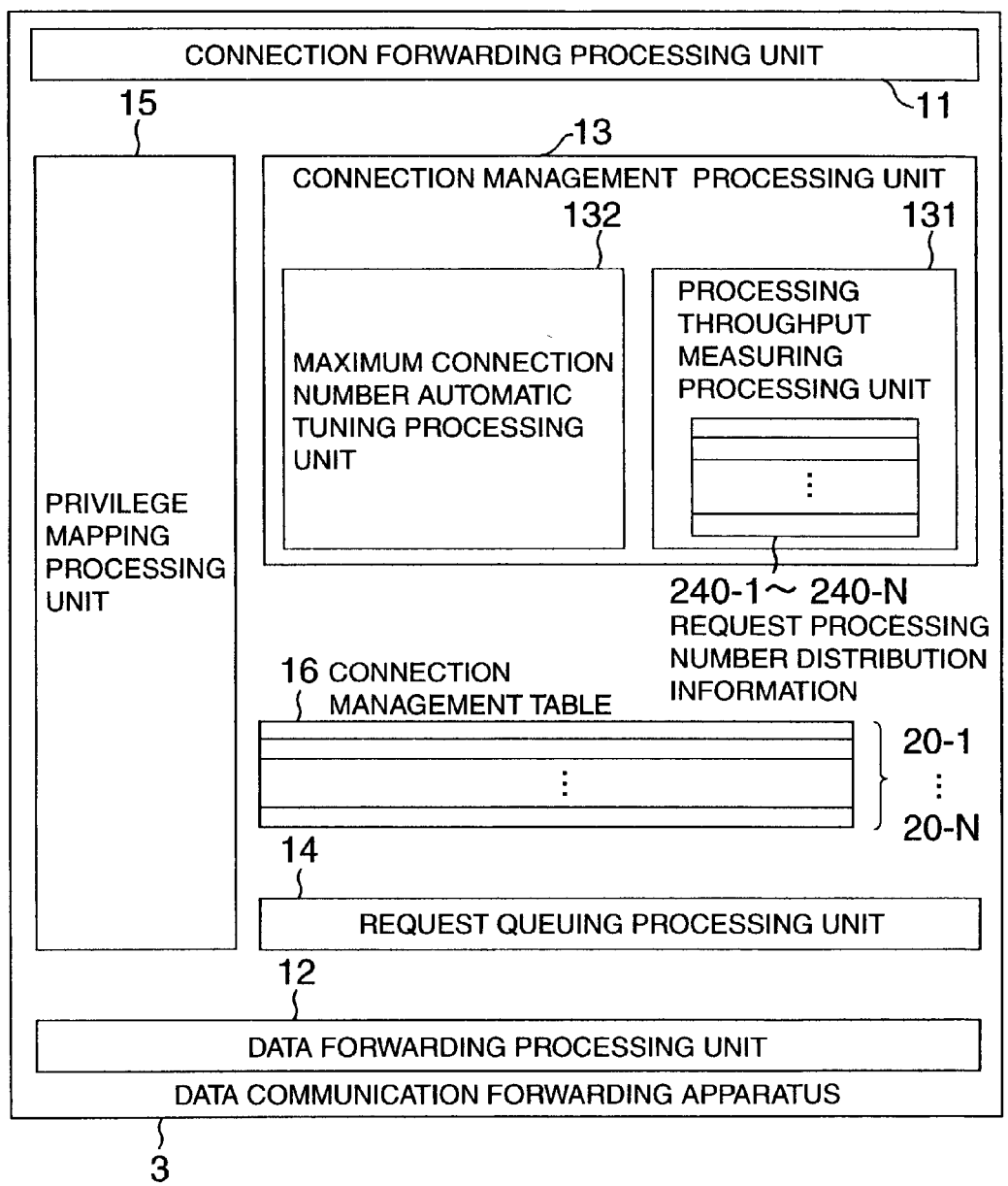
FIG. 22 is a structure of the data communication forwarding apparatus of the present embodiment having a function of automatically tuning maximum connection number information for the server apparatus in the present embodiment.

In this example, explanation has been made in connection with the example wherein the maximum queuing number field 25 to the destination server apparatus has a fixed value specified by the operator. FIG. 22 shows an example of a structure of the data communication forwarding apparatus 3 for automatically tuning the maximum queuing number field 25.

In this embodiment, the connection management processing unit 13 in the data communication forwarding apparatus 3 as a specific processing unit has a new throughput measuring processing unit 131 and maximum connection number automatic tuning processing unit 132. The throughput measuring processing unit 131 further has request processing number distribution information 240-1 to 240-N holding request processing number information associated with respective connection table entries 20-1 to 20-N.

The throughput measuring processing unit 131 measures a request processing number distribution per time to the request queuing number for each of the server apparatus or apparatuses associated with the connection management table entries 20. More specifically, the throughput measuring processing unit 131 equi-divides by m the value of the maximum queuing number field 25 of the connection management table entries 20, and measures a request processing number distribution per time for a range of the current connection number of the equi-m divisions.

Figure 23:
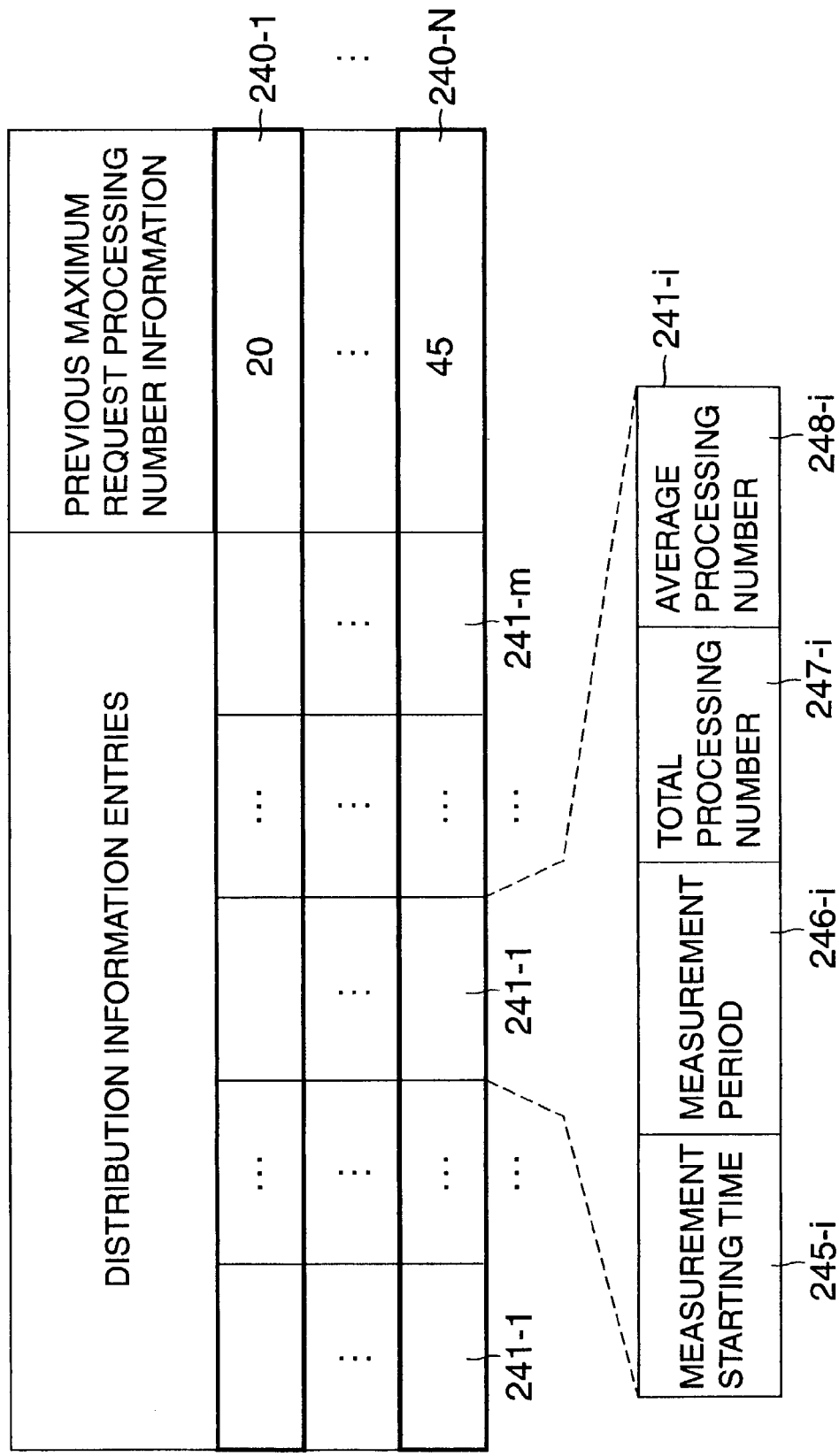
FIG. 23 is a structure of request processing number distribution information per unit time possessed by a processing throughput measuring processing unit as associated with the connection management table entries in the present embodiment.

FIG. 23 shows a structure of request processing number distribution information 240 per unit time in this example possessed by the processing throughput measuring processing unit 131 associated with the connection management table entries 20. Each of the request processing number distribution information 240 has m distribution information entries 241-1 to 241-m and previous maximum request processing number information 242. The distribution information entries 241-1 to 241-m hold respective request processing number distribution information per unit time for a range of the current connection number of equi-m divisions of the value of the maximum queuing number field 25. Respective distribution information entries 241-i (i=1 to m) have measurement start times 245-i, measurement periods 246-i, total processing numbers 247-i and average processing numbers 248-i, respectively. In this connection, it is assumed that the request processing number distribution information 240 are initially initialized all at zero.

Figure 24:
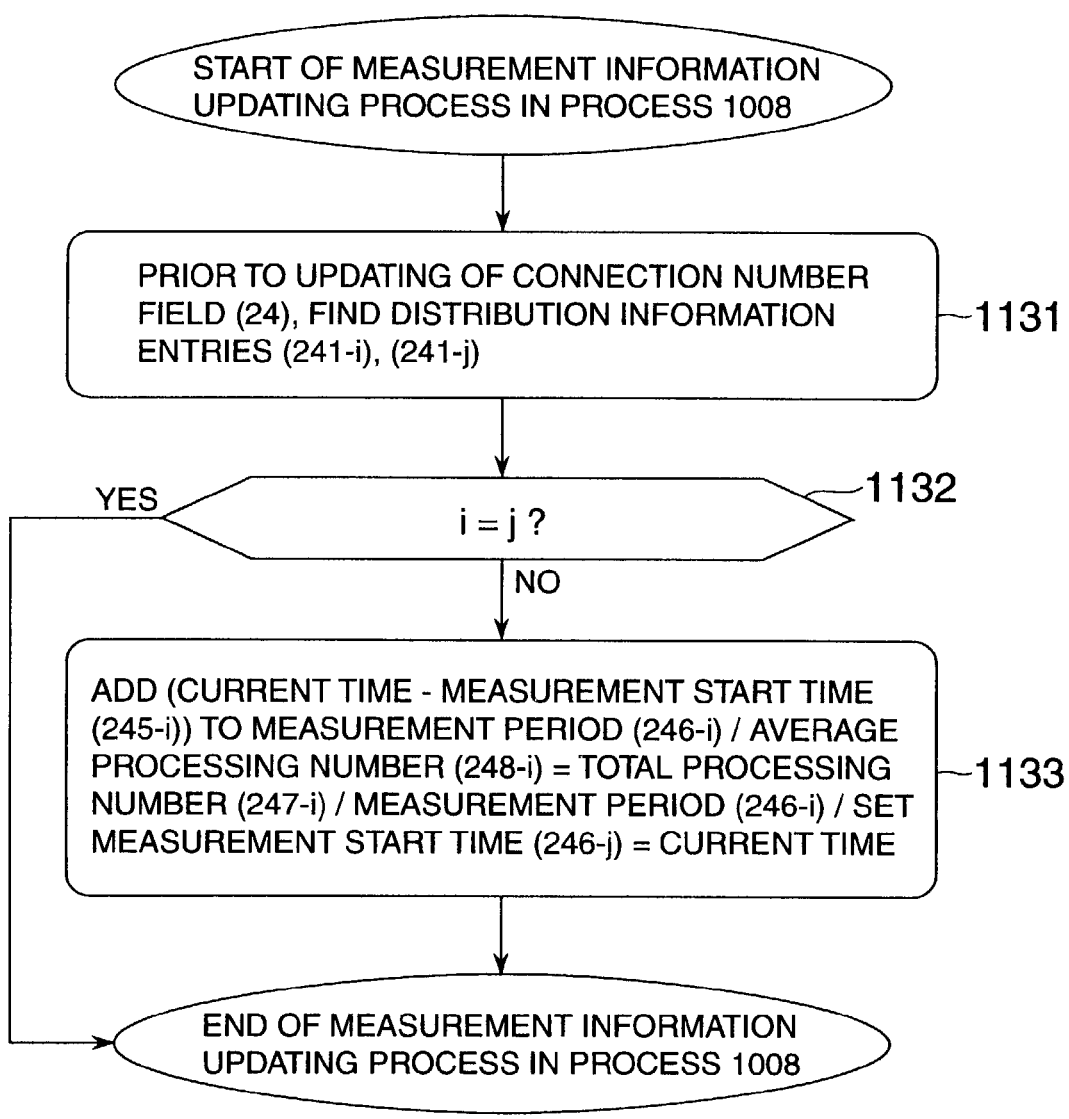
FIG. 24 is a flowchart showing the processing throughput measuring operations of a process 1008 when a connection management processing unit adds and updates a connection number field in the present embodiment.
Figure 25:
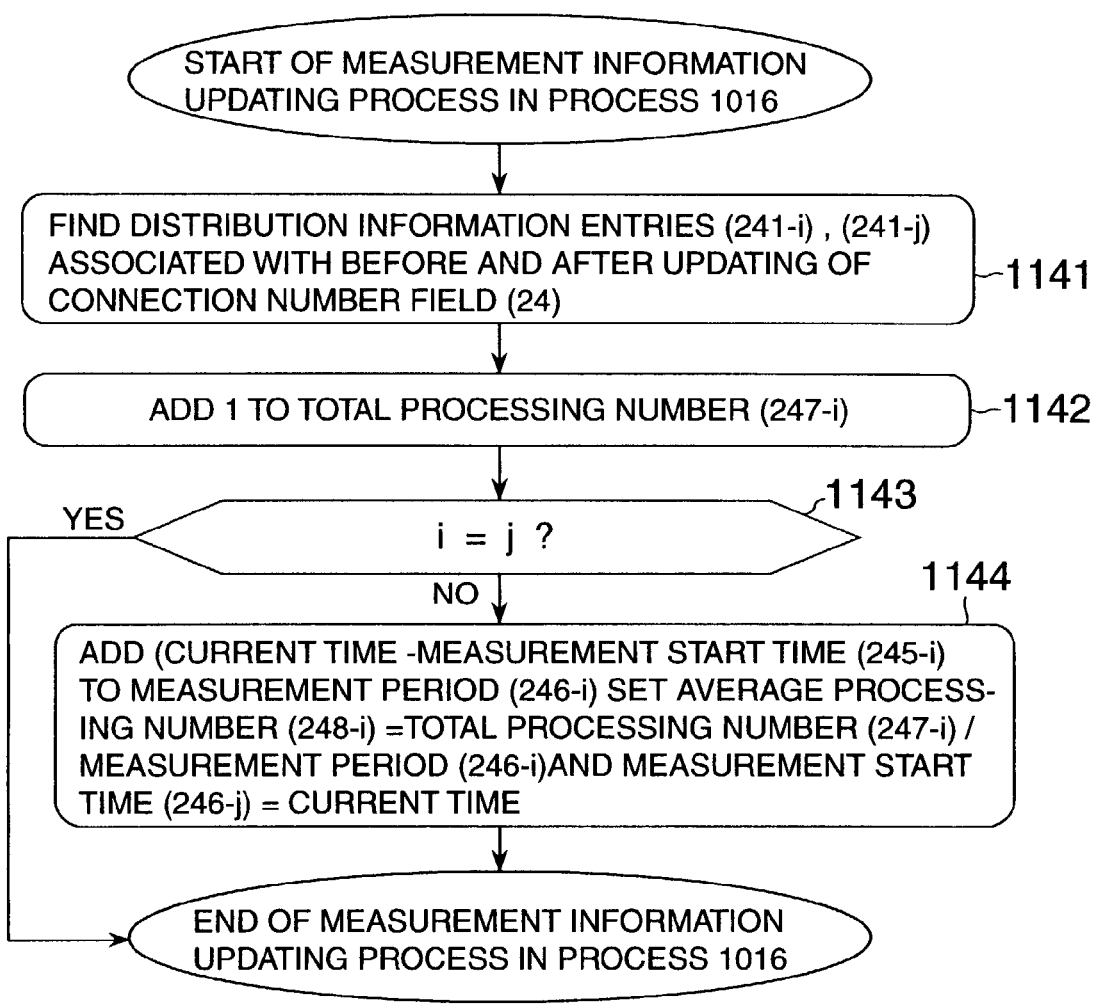
FIG. 25 is a flowchart showing the process throughput measuring operations of a process 1016 when the connection management processing unit takes or subtracts and updates a connection number field in the present embodiment.

FIGS. 24 and 25 show flowcharts of setting/updating operations about the request processing number distribution information 240 in the throughput measuring processing unit 131. FIG. 24 is a flowchart of processing operations of the throughput measuring processing unit 131 when the connection management processing unit 13 makes an incremental update of the connection number field 24 in the process 1008; while FIG. 25 is a flowchart of processing operations of the processing throughput measuring processing unit 131 when the connection management processing unit connection management processing unit 13 makes a decremental update of the connection number field 24 in the process 1016.

As the processing operations when the connection management processing unit 13 makes an incremental update of the connection number field 24 in the process 1008 in FIG. 24, the throughput measuring processing unit 131 first finds a distribution information entry 241-i corresponding to the connection number before the update and a distribution information entry 241-j corresponding to the connection number after the update (process 1131).

Next, the throughput measuring processing unit 131 examines whether or not the distribution information entry 241-i before the update is different from the distribution information entry 241-j after the update (process 1132).

When the both entries are different from each other, the throughput measuring processing unit 131 adds difference values between the current time and the throughput measuring processing unit 131 sets the average processing number 248-i from the quotient of the total processing number 247-i and measurement period 246-i, then the throughput measuring processing unit 131 sets the current time from the updating measurement starting time 245-j in the distribution information entry 241-j (process 1133).

Meanwhile, as processing operations when the connection management processing unit 13 makes a decremental update of the connection number field 24 in the process 1016 in FIG. 25, the throughput measuring processing unit 131 first finds both the distribution information entry (241-i) corresponding to the connection number before updating and the distribution information entry (241-j) corresponding to the connection number after updating (process 1141).

Next the throughput measuring processing unit 131 adds 1 to the total processing number 247-i of the distribution information entry 241-i before updating (process 1142).

Thereafter the throughput measuring processing unit 131 examines whether or not the distribution information entry 241-i before updating is different from the distribution information entry 241-j after updating (process 1143).

When the both entries are different from each other, the throughput measuring processing unit 131 adds difference values between the current time and the throughput measuring processing unit 131 sets the average processing number 248-i from the quotient of the total processing number 247-i and measurement period 246-i, then the throughput measuring processing unit 131 sets the current time from the updating measurement starting time 245-j in the distribution information entry 241-j (process 1144).

FIG. 26 shows a flowchart of automatically tuning operations to the maximum queuing number field 25 of the connection management table entries 20 in the maximum connection number automatic tuning processing unit 132.

The operation of the maximum connection number automatic tuning processing unit 132 is an infinity loop process which starts periodically and tunes the maximum queuing number fields 25 in all of the connection management table entries 20 automatically.

The maximum connection number automatic tuning processing unit 132 first initializes all the request processing number distribution information 240 to zero (process 1151).

Next the maximum connection number automatic tuning processing unit 132 sets to be started at a predetermined time and puts the automatic tuning operation in its sleep state (process 1152).

The maximum connection number automatic tuning processing unit 132 then extracts one entry 20-i sequentially from the connection management table 16 (process 1153).

Next, in the absence of the connection management table entry 20-i to be processed, the maximum connection number automatic tuning processing unit 132 returns to the process 1152 (process 1154).

The maximum connection number automatic tuning processing unit 132 then finds the request processing number distribution information 240-i corresponding to the connection management table entry 20-i (process 1155).

Then the maximum connection number automatic tuning processing unit 132 finds the distribution information entry 241-j of the request processing number distribution information 240-i corresponding to the value of the connection number field 24 of the connection management table entry 20-i (process 1156).

The maximum connection number automatic tuning processing unit 132 adds the reminder of the measurement starting time 245-j from the current time and sets the quotient of the total processing number 247-j and measurement period 246-j to the average processing number 248-j in the distribution information entry 248-j which is calculated by the process 1155 (process 1157).

The maximum connection number automatic tuning processing unit 132 then searches for all the distribution information entries 241-1 to 241-m of the request processing number distribution information 240-i and finds one 241-k of the distribution information entries which has the largest average processing number 248-k. In the case where the average processing numbers are the same, the maximum connection number automatic tuning processing unit 132 finds the entry having a larger k value (process 1158).

Next the maximum connection number automatic tuning processing unit 132 examines whether or not k is equal to m (process 1159).

When k is equal to m, the maximum connection number automatic tuning processing unit 132 sets the average processing number 248-k of the distribution information entry 241-k in the previous maximum request processing number information 242 of the request processing number distribution information 240-i, increases the maximum queuing number field 25 of the connection management table entry 20-i by a certain pre-fixed number or a certain pre-fixed rate number, and jumps to a process 1169 (process 1160).

When k is not equal to m, with regard to the distribution information entries 241-k+1 to 241-m, the maximum connection number automatic tuning processing unit 132 finds a distribution information entry 241-x therefrom not having a measurement period 246-x of zero (process 1161).

In the absence of the distribution information entry 241-x not having the measurement period 246-x of zero, the maximum connection number automatic tuning processing unit 132 judges as unnecessary change and jumps to a process 1169 (process 1162).

In the presence of the distribution information entry 241-x not having the measurement period 246-x of zero, the maximum connection number automatic tuning processing unit 132 compares the average processing number 248-k of the distribution information entry 241-k with the previous maximum request processing number information 242 of the request processing number distribution information 240-i (process 1163).

When the value of the previous maximum request processing number information 242 is not smaller than the value of the average processing number 248-k of the distribution information entry 241-k, the maximum connection number automatic tuning processing unit 132 judges as unnecessary change and jumps to a process 1169.

When the average processing number 248-k of the distribution information entry 241-k is larger than the previous maximum request processing number information 242, the maximum connection number automatic tuning processing unit 132 clears the previous maximum request processing number information 242 of the request processing number distribution information 240-i to zero, decreases the maximum queuing number field 25 of the connection management table entry 20-i by a certain pre-fixed number or a certain pre-fixed rate number, and jumps to a process 1169 (process 1164).

As the post-processing for each connection management table entry 20-i, the maximum connection number automatic tuning processing unit 132 clears the measurement period 246-j, total processing number 247-j and average processing number 248-j of all the distribution information entries 241-j (j=1 to m) of the request processing number distribution information (240-i) to zero, and returns to the process 1153 (process 1169).

The foregoing embodiment can automatically tune the maximum connection number at which processing throughput becomes maximum for a specific server apparatus or apparatuses.

The above embodiment can suppress the simultaneous request number to the destination server apparatus to a range of processing ability of the device and can prevent abrupt performance deterioration of the destination server apparatus. Further, the embodiment can perform the operation based on the priority set according to the user or business attributes. Furthermore, the embodiment can temporarily increase the priority depending on the waiting time or use count. In addition, once the embodiment starts the operation, it can process for a constant period with a high priority. As a result, when the user waits for a certain time, the user can receive the service relatively quickly and can avoid an indefinite long service waiting time and thus user's re-execution resulting from such a long waiting time.

In accordance with the present invention, access concentration to a server can be suppressed and thus reduction of the server service quality can be avoided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data communication forwarding apparatus in a service system including a client apparatus and a server apparatus, said client apparatus issuing a service request to said server apparatus, said server apparatus receiving the service request from the client apparatus to offer a service, said data communication forwarding apparatus forwarding a data communication between said client and server apparatuses, said data communication forwarding apparatus comprising:
   a connection forwarding unit that forwards a connection request to said server apparatus as a destination in response to the service request from said client apparatus to said server apparatus;
   a data forwarding unit that forwards the data communication between said client and server apparatuses by use of an established connection;
   a connection managing unit that manages the number of connections established to said server apparatus;
   a request queuing unit that controls service request forwarding in response to the service request from said client apparatus to said server apparatus according to an instruction of said connection managing unit in such a manner that the number of connections to said server apparatus is not larger than a predetermined number of connections,
   wherein said request queuing unit has a plurality of priority queues based on priorities;
   a priority queue managing unit that queues each service request in a corresponding priority queue according to a priority allocated to each service request and at the time of extracting the service request from said priority queue, and that extracts the service request from said priority queue having a high priority,
   wherein said priority queue managing unit holds wait count information overtaken by a service request having a high service request for each service request; and
   an anti-starvation processing unit that, when the wait count information of a service request exceeds a certain maximum wait count, extracts the service request preferentially from the queue and forwards it if the other service requests are all not higher in priority than a certain priority but even if some of the other service requests are higher in priority than the service request in question.

2. The data communication forwarding apparatus as set forth in claim 1, wherein said anti-starvation processing unit holds service request arrival time information for each service request in place of the overtaken wait count information, and wherein, when a wait time after service request time information of a request exceeds a certain maximum waiting time, the request is preferentially extracted from the queue and forwarded if the other service requests are all not higher in priority than a certain priority but even if some of the other service requests are higher in priority than the service request in question.

3. The data communication forwarding apparatus as set forth in claim 2, wherein said anti-starvation processing unit holds both of said wait count information and said service request time information, and wherein, when the wait count or service request time exceeds either one of the maximum wait count and maximum wait time, the service request is preferentially extracted from the queue and forwarded if the other service requests are all not higher in priority than a certain priority but even if some of the other service requests are higher in priority than the service request in question.

4. A data communication forwarding apparatus in a service system including a client apparatus and a server apparatus, said client apparatus issuing a service request to said server apparatus, said server apparatus receiving the service request from the client apparatus to offer a service, said data communication forwarding apparatus forwarding a data communication between said client and server apparatuses, said data communication forwarding apparatus comprising:
   a connection forwarding unit that forwards a connection request to said server apparatus as a destination in response to the service request from said client apparatus to said server apparatus;
   a data forwarding unit that forwards the data communication between said client and server apparatuses by use of an established connection;
   a connection managing unit that manages the number of connections established to said server apparatus;
   a request queuing unit that controls request forwarding in response to the service request from said client apparatus to said server apparatus according to an instruction of said connection managing unit in such a manner that the number of connections to said server apparatus is not larger than a predetermined number of connections; and
   a privilege mapping unit that maps priority token information offered together with the service request of said client apparatus to the priority of each service request,
   wherein said priority token information includes address information of a server apparatus or apparatuses as a destination or destinations and priority information, and when the address or addresses of the destination server apparatus or apparatuses correspond to the address information of the destination server apparatus or apparatuses included in the priority token information, said privilege mapping unit determines the priority of the service request according to the priority information of the priority token information.

5. The data communication forwarding apparatus as set forth in claim 4, wherein said priority token information further includes valid period information of the priority token, said privilege mapping unit examines the valid period information of the priority token information offered together with the service request from the client apparatus, and maps the priority token information to the priority based on said priority token information when the priority token information is valid and maps the priority token information to the priority based on other information when the priority token information is invalid.

6. A data communication forwarding apparatus in a service system including a client apparatus and a server apparatus, said client apparatus issuing a service request to said server apparatus, said server apparatus receiving the service request from the client apparatus to offer a service, said data communication forwarding apparatus forwarding a data communication between said client and server apparatuses, said data communication forwarding apparatus comprising:

a connection forwarding unit that forwards a connection request to said server apparatus as a destination in response to the request from said client apparatus to said server apparatus;

a data forwarding unit that forwards the data communication between said client and server apparatuses by use of an established connection;

a connection managing unit that manages the number of connections established to said server apparatus;

a request queuing unit that controls request forwarding in response to the service request from said client apparatus to said server apparatus according to an instruction of said connection managing unit in such a manner that the number of connections to said server apparatus is not larger than a predetermined number of connections;

a privilege mapping unit that maps priority token information offered together with the service request of said client apparatus to the priority of each service request, wherein said privilege mapping unit has a section that generates priority token information in response to the service request from said client apparatus and returns it, and said client apparatus has a section that issues a service request using the returned priority token information.

7. The data communication forwarding apparatus as set forth in claim 6, wherein said server apparatus comprises:

a priority token control unit that, at the time of returning a response to said client apparatus, attaches to said response priority token control information indicative of an instruction of permission or non-permission of generation/update of the priority token information and/or of priority change and returns the response to the priority token generation/update unit of said data communication forwarding apparatus, and said priority token generation/update unit of said data communication forwarding apparatus generates/updates the priority token information by referring to the instruction of the priority token control information.

8. The data communication forwarding apparatus as set forth in claim 7, wherein said priority token return section encrypts the priority token information and returns it to said client apparatus.

9. The data communication forwarding apparatus as set forth in claim 8, further comprising:

a unit that sets one or more parameters for setting the data communication forwarding apparatus in associated with a specific destination server apparatus or apparatuses.

10. A data communication forwarding apparatus in a service system including a client apparatus and a server apparatus, said client apparatus issuing a service request to said server apparatus, said server apparatus receiving the service request from the client apparatus to offer a service, said data communication forwarding apparatus forwarding a data communication between said client and server apparatuses, said data communication forwarding apparatus comprising:

a connection forwarding unit that forwards a connection request to said server apparatus as a destination in response to the service request from said client apparatus to said server apparatus;

a data forwarding unit that forwards the data communication between said client and server apparatuses by use of an established connection;

a connection managing unit that manages the number of connections established to said server apparatus;

a request queuing unit that controls request forwarding in response to the service request from said client apparatus to said server apparatus according to an instruction of said connection managing unit in such a manner that the number of connections to said server apparatus is not larger than a predetermined number of connections; and a privilege mapping unit that maps priority token information offered together with the service request of said client apparatus to the priority of each request, wherein said privilege mapping unit has a priority token generation/update section and a priority token return section, said priority token generation/update section generates priority token information under predetermined conditions when the client apparatus fails to offer the priority token information, updates or discards the priority token under predetermined conditions when said client apparatus offers the priority token information, and priority token return section returns the priority token information generated or updated by the priority token generation/update section of said client apparatus.

11. The data forwarding system using the data communication forwarding apparatus of claim 10, wherein said service request queuing unit holds maximum queuing number information associated with said server apparatus and when said service request queuing unit receives service requests exceeding the maximum queuing number from said client apparatus, said priority token generation/update section generates the priority token information which can be mapped to a higher priority, and said priority token return section returns the generated priority token information to said client apparatus together with congestion error information.

12. The data communication forwarding apparatus as set forth in claim 11, wherein said priority token generation/update unit that, at the time of generating priority token information which can be mapped to a higher priority, generates priority token information having a valid period which becomes valid after a predetermined period and later set therein.

13. The data forwarding system using the data communication forwarding apparatus of claim 10, wherein said service request queuing unit holds maximum queuing number information associated with said server apparatus and when the service request received from said client apparatus exceeds the maximum queuing time, said priority token generation/update section generates the priority token information which can be mapped to a higher priority, and said priority token return section returns the generated priority token information to said client apparatus together with timeout error information.

14. The data forwarding system using the data communication forwarding apparatus of claim 10, wherein said priority token information includes, in addition to server apparatus information, valid period information and priority information, any one or more of initial starting time information of a valid period at the time of initial generation, priority token update count information, connection establishment count to the server apparatus, and total connection waiting time information, said priority token generation/update section updates the priority token information when an update period is within a updatable period from the initial starting time or when an update frequency or connection establishment count is not larger than a certain maximum update count or a certain maximum connection establishment count, generates new priority token information or discards the priority token information when said conditions are not satisfied, generates priority information which can be mapped to a higher priority when the connection establishment count is not smaller than a predetermined connection establishment count or when the connection waiting time is not smaller than a predetermined connection waiting time or when the queuing count is not smaller than said maximum queuing count, updates or initializes the valid period information, update count information, connection establishment count information and connection waiting time information and generates new priority token information based on said information and said priority information when the priority token information is updated or generated.

15. A data communication forwarding apparatus in a service system including a client apparatus and a server apparatus, said client apparatus issuing a service request to said server apparatus, said server apparatus receiving the service request from the client apparatus to offer a service, said data communication forwarding apparatus forwarding a data communication between said client and server apparatuses, said data communication forwarding apparatus comprising:
    a connection forwarding unit that forwards a connection request to said server apparatus as a destination in response to the service request from said client apparatus to said server apparatus;
    a data forwarding unit that forwards the data communication between said client and server apparatuses by use of an established connection;
    a connection managing unit that manages the number of connections established to said server apparatus;
    a request queuing unit that controls request forwarding in response to the request from said client apparatus to said server apparatus according to an instruction of said connection managing unit in such a manner that the number of connections to said server apparatus is not larger than a predetermined number of connections;
    a processing throughput measuring unit; and
    a maximum connection number automatic tuning unit,
    wherein said processing throughput measuring unit measures a request processing number per unit time for each server apparatus,
    wherein said maximum connection number automatic tuning unit uses the request processing number information obtained by the processing throughput measuring unit, increases the maximum connection number of said server apparatus when the number of connections reach a current maximum number of connections set value to said server apparatus but when the request processing number per unit time for said server apparatus or apparatuses is not decreased, and decreases the maximum number of connections value when the request processing number tends to decrease in the vicinity of the maximum connection number set value,
    wherein said processing throughput measuring unit measures a service request processing number distribution per unit time with respect to a current connection number for each server apparatus,
    wherein said maximum connection number automatic tuning unit uses the service request processing number distribution information obtained by said processing throughput measuring unit, increases the maximum connection number of the server apparatus or apparatuses in a certain range when the service request processing number per unit time if presence of the current connection number of the current maximum connection number set value to said server apparatus or apparatuses is higher than the service request processing number of another current connection number, and decreases the maximum connection number value when the service request processing number per unit time to the current connection number not larger than the current maximum connection number set value is higher.

* * * * *